US012226972B2

(12) United States Patent
Hansen et al.

(10) Patent No.: US 12,226,972 B2
(45) Date of Patent: *Feb. 18, 2025

(54) SYSTEM FOR MANUFACTURING MOLD-BASED EQUIPMENT FOR DIRECT INJECTION PRODUCTION OF FOOTWEAR AND A METHOD FOR MANUFACTURING FOOTWEAR

(71) Applicant: ECCO Sko A/S, Bredebro (DK)

(72) Inventors: Jakob Moller Hansen, Bredebro (DK); Jens Sonne Mortensen, Bredebro (DK)

(73) Assignee: ECCO Sko A/S, Bredebro (DK)

( * ) Notice: Subject to any disclaimer, the term of this patent is extended or adjusted under 35 U.S.C. 154(b) by 381 days.

This patent is subject to a terminal disclaimer.

(21) Appl. No.: 17/438,666

(22) PCT Filed: Mar. 12, 2020

(86) PCT No.: PCT/DK2020/050062
§ 371 (c)(1),
(2) Date: Sep. 13, 2021

(87) PCT Pub. No.: WO2020/182259
PCT Pub. Date: Sep. 17, 2020

(65) Prior Publication Data
US 2022/0152961 A1 May 19, 2022

(30) Foreign Application Priority Data

Mar. 13, 2019 (EP) ................................. 19162519
May 21, 2019 (EP) ................................. 19175667
(Continued)

(51) Int. Cl.
B29D 35/00 (2010.01)
A43D 3/02 (2006.01)
(Continued)

(52) U.S. Cl.
CPC ......... *B29D 35/0027* (2013.01); *A43D 3/024* (2013.01); *B29C 33/3835* (2013.01);
(Continued)

(58) Field of Classification Search
CPC ............ B29D 35/0027; B29D 35/0036; B29D 35/061; B29D 35/122; B29D 35/0045;
(Continued)

(56) References Cited

U.S. PATENT DOCUMENTS 696,246 A    3/1902  Kosters
1,163,630 A  12/1915 Anderson
(Continued)

FOREIGN PATENT DOCUMENTS

AU          419135 B2       11/1971
AU          2016204359      1/2018
(Continued)

OTHER PUBLICATIONS

Office Action for U.S. Appl. No. 17/438,854, mailed on Oct. 20, 2023, Mortensen, "Footwear Injection Mould", 8 Pages.
(Continued)

*Primary Examiner* — Mathieu D Vargot
(74) *Attorney, Agent, or Firm* — Lee & Hayes, P.C.

(57) ABSTRACT

A system of manufacturing equipment including molds for a direct injection production of footwear. The system includes a design facility that provides a design. A mold manufacturing facility manufactures a mold for the design for molding a sole of the footwear. A last manufacturing facility manufactures a last of the design. A footwear manufacturing facility manufactures footwear according to the design. The last corresponds to the footwear design and the mold corresponds to the footwear design. The mold is a basic direct injection mold and at least partly channels injection material to a mold cavity and further accommo-
(Continued)

Figure 1:
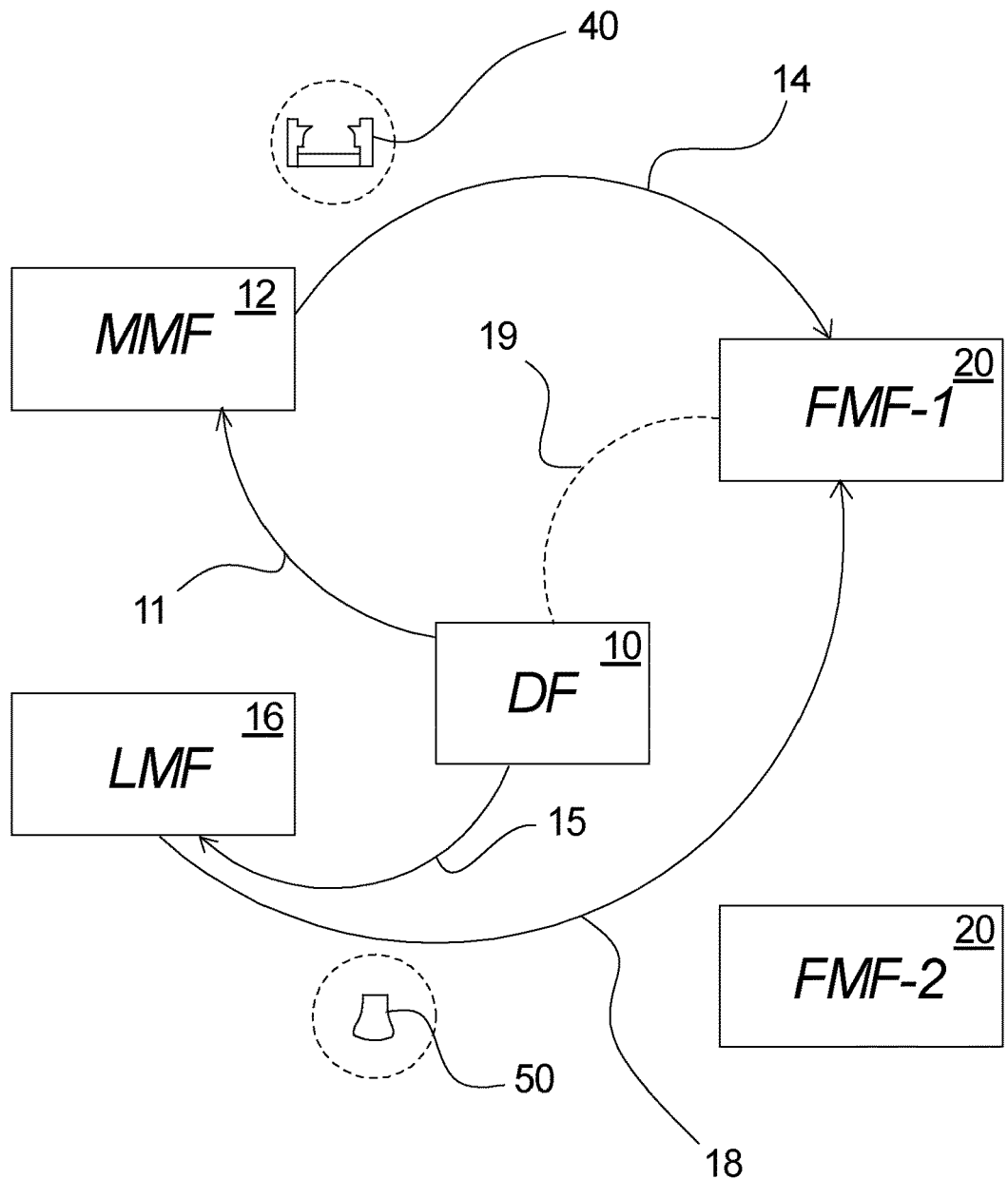

dates direct injection mold inserts. Mold descriptive data of the mold inserts is communicated to the footwear manufacturing facility to manufacture the mold inserts, or the mold inserts are manufactured at the mold manufacturing facility based on the mold descriptive data and transported to the footwear manufacturing facility.

16 Claims, 18 Drawing Sheets

(30) Foreign Application Priority Data

Jul. 18, 2019 (DK) .................................. 2019 70470
Aug. 19, 2019 (EP) .................................... 19192265

(51) Int. Cl.
  *B29C 33/38* (2006.01)
  *B29D 35/06* (2010.01)
  *B29D 35/12* (2010.01)
  *B33Y 80/00* (2015.01)

(52) U.S. Cl.
  CPC ...... *B29C 33/3842* (2013.01); *B29D 35/0036* (2013.01); *B29D 35/061* (2013.01); *B29D 35/122* (2013.01); *B33Y 80/00* (2014.12); *B29D 35/0045* (2013.01)

(58) Field of Classification Search
  CPC . B29C 33/3835; B29C 33/3842; B33Y 80/00; A43D 3/024
  See application file for complete search history.

(56) References Cited

U.S. PATENT DOCUMENTS

| | | | |
|---|---|---|---|
| 1,460,358 A | 6/1923 | Krentler |
| 3,314,173 A | 4/1967 | Szerenyl |
| 3,317,940 A | 5/1967 | Herbert |
| 3,501,793 A | 3/1970 | Jonas |
| 3,601,831 A | 8/1971 | Daum |
| 3,677,679 A | 7/1972 | Christie et al. |
| 5,871,683 A | 2/1999 | Schaper et al. |
| 5,881,413 A | 3/1999 | Throneburg et al. |
| 6,132,663 A | 10/2000 | Johnson |
| 10,293,565 B1 | 5/2019 | Tran |
| 2001/0020222 A1 | 9/2001 | Lee et al. |
| 2005/0071935 A1 | 4/2005 | Shah et al. |
| 2005/0144034 A1 | 6/2005 | Hunter |
| 2007/0193068 A1 | 8/2007 | Calvano et al. |
| 2007/0240338 A1 | 10/2007 | Din Mahamed |
| 2009/0072436 A1 | 3/2009 | Dean |
| 2014/0277658 A1 | 9/2014 | Hanft |
| 2015/0298413 A1 | 10/2015 | Yang |
| 2016/0107391 A1 | 4/2016 | Parish et al. |
| 2016/0166010 A1 | 6/2016 | Bruce et al. |
| 2016/0360823 A1 | 12/2016 | Garbujo et al. |
| 2017/0095036 A1 | 4/2017 | Chen |
| 2017/0197345 A1 | 7/2017 | Okamoto |
| 2017/0202309 A1 | 7/2017 | Sterman et al. |
| 2017/0238659 A1 | 8/2017 | Bohnsack et al. |
| 2017/0239903 A1 | 8/2017 | Kilgore |
| 2017/0239909 A1 | 8/2017 | Janney et al. |
| 2017/0306539 A1 | 10/2017 | Gladish |
| 2018/0317606 A1 | 11/2018 | Schneider |
| 2019/0073709 A1 | 3/2019 | Hayes et al. |
| 2019/0153149 A1* | 5/2019 | Toba .................. C08F 290/061 |
| 2019/0344519 A1 | 11/2019 | Lin et al. |
| 2022/0152962 A1* | 5/2022 | Hansen ............... B29C 45/0001 |
| 2023/0189938 A1 | 6/2023 | Hansen |

FOREIGN PATENT DOCUMENTS

| | | |
|---|---|---|
| CN | 1475340 A | 2/2004 |
| CN | 101557925 A | 10/2009 |
| CN | 102414013 A | 4/2012 |
| CN | 102596551 A | 7/2012 |
| CN | 202592652 U | 12/2012 |
| CN | 203665868 U | 6/2014 |
| CN | 203697349 U | 7/2014 |
| CN | 105495863 A | 4/2016 |
| CN | 106103035 A | 11/2016 |
| CN | 205869403 | 1/2017 |
| CN | 206170682 | 5/2017 |
| CN | 206568446 U | 10/2017 |
| CN | 207011808 U | 2/2018 |
| CN | 108158134 A | 6/2018 |
| CN | 108673919 A | 10/2018 |
| CN | 213618060 U | 7/2021 |
| DE | 2721443 A1 | 11/1978 |
| DE | 10319593 | 11/2003 |
| EP | 0313312 A2 | 4/1989 |
| EP | 2110037 A1 | 10/2009 |
| ES | 2653974 B2 | 10/2018 |
| FR | 1414588 A | 10/1965 |
| FR | 2572324 B4 | 12/1986 |
| GB | 1075256 A | 7/1967 |
| GB | 1083199 | 9/1967 |
| GB | 1197727 A | 7/1970 |
| GB | 1504232 | 3/1978 |
| GB | 2105252 | 3/1983 |
| JP | 2004090998 | 5/2004 |
| JP | 2016097116 A | 5/2016 |
| JP | 2016198496 A | 12/2016 |
| JP | 2018194945 | 12/2018 |
| KR | 20020096188 | 12/2002 |
| KR | 100737426 | 7/2007 |
| KR | 20170089514 | 8/2017 |
| TW | 587014 B | 5/2004 |
| WO | 02070239 W | 9/2002 |
| WO | WO2007126184 | 11/2007 |
| WO | WO2008049430 | 5/2008 |
| WO | WO2010136855 | 12/2010 |
| WO | WO2011049306 | 4/2011 |
| WO | WO2013143541 | 10/2013 |
| WO | 2015033272 A1 | 3/2015 |
| WO | WO2016196995 | 12/2016 |
| WO | 2019219532 A1 | 11/2019 |
| WO | 2020011514 A1 | 1/2020 |
| WO | 2020182260 A1 | 9/2020 |
| WO | WO2020182259 | 9/2020 |
| WO | WO2020182261 | 9/2020 |

OTHER PUBLICATIONS

Office Action for U.S. Appl. No. 17/612,693, mailed on Nov. 7, 2023, Jakob Moller Hansen, "Footwear Last", 13 pages.
PCT Search Report for corresponding PCT Application No. PCT/DK2020/050062 dated May 18, 2020, 4 pages.
Chunlei, Chai "Business Innovation Design", Huazhong University of Science and Technology Press, Jun. 30, 2014, 4 pages.
Office Action for U.S. Appl. No. 17/636,334, mailed on Jan. 18, 2024, Hansen, "A Footwear Injection Mould", 7 pages.
Office Action for U.S. Appl. No. 17/438,717, mailed on Apr. 17, 2024, Hansen, "A System For Manufacturing Last-Based Equipment for Direct Injection Production of Footwear and a Method for Manufacturing Footwear", 9 pages.
Office Action for U.S. Appl. No. 17/438,717, mailed on Oct. 7, 2024, Hansen, "A System for Manufacturing Last-Based Equipment for Direct Injection Production of Footwear and a Method for Manufacturing Footwear", 7 Pages.
Office Action for U.S. Appl. No. 17/636,334, Dated Aug. 1, 2024.

* cited by examiner

SYSTEM FOR MANUFACTURING MOLD-BASED EQUIPMENT FOR DIRECT INJECTION PRODUCTION OF FOOTWEAR AND A METHOD FOR MANUFACTURING FOOTWEAR

This Application claims priority to PCT Application No. PCT/DK2020/050062, filed Mar. 12, 2020, which claims priority to EP patent application Ser. No. 19/162,519.3, filed Mar. 13, 2019; to EP patent application Ser. No. 19/175,667.5, filed on May 21, 2019; to EP patent application Ser. No. 19/192,265.7, filed on Aug. 19, 2019; and to DK Patent Application No. PA 2019 70470, filed Jul. 18, 2019, the contents of each of which is incorporated herein by reference.

FIELD OF THE INVENTION

The Invention relates to a system for manufacturing equipment for a direct injection production (DIP) of footwear.

The invention further relates to a system for manufacturing footwear, which system utilizes equipment for a direct injection production (DIP) of footwear, said equipment having been manufactured by a system for manufacturing equipment according to the invention.

Even further, the invention relates to a method of manufacturing footwear by direct injection production (DIP).

BACKGROUND OF THE INVENTION

Shoe manufacturing is often a mass production process that involves customized equipment for the production.

The shoe sole can be attached to an upper by e.g. direct injection moulding where the injection moulds conventionally are manufactured from e.g. aluminium that may be CNC cut to define mould cavity. The methods of preparing moulds are time consuming and expensive as the equipment needed are relatively expensive. Furthermore, designing new lines of shoe often involves a plurality of adjustments before the finished shoe line is ready for production and herein each size and orientation of the shoe needs a separate mould.

Preparing equipment e.g. moulds for shoe production is conventionally a process involving several locations e.g. a design facility providing a footwear design, a last manufacturing facility and a mould manufacturing facility. The production may require a relatively long running-in period, e.g. due to the respective locations being located away from each other and due to the time-consuming transports of the respective tools, e.g. moulds and lasts, possibly enlarged by any necessary corrections to the equipment. Furthermore, the costs involved in a start-up of a new footwear design may thus be relatively large.

Thus, there is a need for a more efficient and flexible system to produce equipment for shoe production.

SUMMARY OF THE INVENTION

The invention relates to a system for manufacturing equipment for a direct injection production (DIP) of footwear, said equipment comprising moulds configured for direct injection production of footwear, wherein said system comprises a design facility located at a design facility location, wherein said design facility provides a footwear design,
a mould manufacturing facility located at a mould manufacturing location for manufacturing a mould corresponding to said footwear design, said mould being configured for direct injection moulding of a sole part of said footwear,
a last manufacturing facility located at a last manufacturing location for manufacturing a last corresponding to said footwear design, and
at least one footwear manufacturing facility located at a footwear manufacturing location for manufacturing footwear according to said footwear design, utilizing said last corresponding to said footwear design and said mould corresponding to said footwear design,
wherein said mould manufactured by said mould manufacturing facility comprises a basic direct injection mould, which is attachable to injection moulding equipment and is configured for at least partly channelling injection material to a mould cavity, said basic direct injection mould further being configured for accommodating direct injection mould inserts to further define said mould cavity,
wherein mould descriptive data relating to said direct injection mould inserts corresponding to said footwear design are provided,
wherein said mould descriptive data are communicated to said at least one footwear manufacturing facility for manufacturing of said direct injection mould inserts at said footwear manufacturing location or wherein said direct injection mould inserts are manufactured at said mould manufacturing facility, based on said mould descriptive data, and transported to said at least one footwear manufacturing facility, and
wherein said direct injection mould inserts are combined with said basic direct injection mould to provide said mould corresponding to said footwear design at said footwear manufacturing location.

Hereby, it may be possible to provide the direct injection mould, ready to be used, at the footwear manufacturing facility in a more cost-efficient and faster manner, e.g. by having a basic direct injection mould already at the footwear manufacturing facility and mounting direct injection mould inserts corresponding to a desired design, which direct injection mould inserts may be relatively quickly and cost-efficiently made locally at the at least one footwear manufacturing facility, based on descriptive data requested and communicated from e.g. the mould manufacturing facility or the design facility. Thus, in case there is need for correction or adjustment of the design of the footwear, correction or adjustment at the start-up of a footwear design production, e.g. due to less than optimal correspondence between last and direct injection mould inserts, etc., return transport of the relatively large mould to the mould manufacturing facility and transport of a corrected mould to the footwear manufacturing facility may be avoided and instead, the locally made direct injection mould inserts may simply be discarded (or possibly returned as documentation only) and new inserts may be made locally, e.g. at the footwear manufacturing facility, based on corrected or adjusted mould descriptive data relating to the mould inserts, and inserted in the basic direct injection mould.

Alternatively, the new, corrected or adjusted, inserts may be made at the mould manufacturing facility and be transported to the footwear manufacturing facility, which also entails that a costly transport, adjustment and return transport of a mould with integrated inner mould surfaces can be avoided and furthermore, it may be achieved that the adjustment or correction can be made quicker, e.g. since the manufacture of the new inserts may be made relatively quickly, based on adjusted descriptive insert data, no matter whether this takes place at the mould manufacturing facility or locally, e.g. at the footwear manufacturing facility.

Furthermore, similar advantages may be achieved when manufacture is changed from one footwear design to another, from one size to another or in analogous circumstances, where new inserts may quickly and cost-efficiently be provided and combined with the basic direct injection mould and where the previously used inserts may be stored for subsequent use or discarded.

Also, it is noted that in case of any wear on the inserts that go beyond acceptable tolerances, the inserts may quickly and cost-efficiently be exchanged for new ones. This may be of importance for example in cases where the inserts have been made of material that has less wear resistance than conventionally used mould materials, e.g. metal, aluminium.

Thus, in general it will be seen that a more efficient manufacturing may be possible, where e.g. downtime may be avoided or at least reduced significantly as opposed to the prior art methods and systems.

It is noted that as regards the basic direct injection mould, which can be attached to injection moulding equipment and is configured for channelling injection material to a mould cavity, it may be seen as being a moulding apparatus in itself, e.g. in that injection material may be injected from the injection moulding equipment via one or more channels and that the injected material via the one or more channels in the basic direct injection mould may be guided to a mould cavity defined by the basic direct injection mould itself. Further, though, by means of the direct injection mould inserts the mould cavity may be further defined, e.g. by providing mould surfaces covering at least partly the inner surfaces of the basic direct injection mould, and where e.g. a shoe upper may define the remaining mould surface.

It should generally be noted that DIP in the public domain may refer to both direct injection process or as sometime herein noted; direction injection production. Unless otherwise stated, DIP may in the present context refer both to a direct injection production and a direct injection process, and the present application does not distinguish between these two different references to the same process/production method.

Manufacturing of footwear by means of DIP in the present context may e.g. be performed by means of direction injection process/production equipment e.g. provided by the machine supplier Desma, e.g. by means of rotary table setups. The material applied for either 3D-printing last, last parts, mould, mould parts within the scope of the invention is unless otherwise noted referred to as additive manufacturing material, whereas the material applied in the footwear manufacturing process for soles in the direct injection production/process by means of the direct injection production/process equipment is referred to as injection material unless otherwise noted. Such injection material may typically be polyurethane or different modifications of polyurethane.

In the present context "descriptive data", be it last descriptive data or mould descriptive data, such data are referring to a data format suitable for establishing the desired last or mould. Typical data formats within the field of 3D printing may be appropriate examples of such data formats, as long as the data formats are suitable for containing comprehensive information facilitating the manufacturing of the last or mould in question. It goes without saying that the comprehensiveness of the descriptive data may not necessarily require a comprehensive description of the complete mould or the complete last. The method and system may well imply that only part(s) of a last or part(s) of a mould are printed.

Such part(s) must be of course be comprehensively defined by the descriptive data, but the last/mould may also comprise other last/mould parts which, when attached to or gathered with the part defined by the descriptive data will form the final last, last part(s), mould and/or mould part(s).

An example in the present context could be a last part, e.g. a last body, which is 3D printed and then gathered with a universal last holder, typically made of a metal or at least made of a very robust material, which may be universally applied for all the different printed last bodies Different types of universal or proprietary file formats may be applied to contain the descriptive data in question.

The most common and universal file formats for 3D printing are STL and VRML. STL stands for "stereolithography"—it is a 3D rendering that contains only a single color. This is typically the file format you would use with desktop 3D printers. VRML ("vermal", .WRL file extension) stands for "Virtual Reality Modeling Language"—it is a newer digital 3D file type that also includes color, so it can be used on desktop 3D printers with more than one extruder (i.e. two more nozzles that each can print with a different color plastic), or with full-color binder jetting technology.

Additive Manufacturing File Format (.AMF) is a new XML-based open standard for 3D printing. Unlike STL, it contains support for color. They can also be compressed to about half the size of a compressed STL file. AMF is not widely used at present, but in future we would like to add this an option for uploading and downloading files to and from the NIH 3D Print Exchange.

Another file format input for 3D printers in GCode. This file contains detailed instructions for a 3D printer to follow for each slice, like the starting point for each layer and the "route" that the nozzle or print head will follow in laying down the material. In addition, 3D printer manufacturers may have their own proprietary input file formats that contain instructions specific to the methodology for that make or model, and that are compatible only with that manufacturer's software. This does not create a barrier to printing with these machines, as the proprietary file format is generated from the user's own STL or WRL file. Some examples include the .form file, used with the PreForm software for Form1 printers, or the .zpr format, proprietary to the ZPrint and ZEdit software used with ZCorp binder jet printers.

Other file formats may be applied within the scope of the invention.

A common understanding of descriptive data in the present context involves data which may be established by a design app/design program at e.g. the design facility and then easily and fast electronically communicated, typically via the Internet, from the design facility to the facility where the last, last part(s), mould or mould part(s) is to be manufactured by 3D printing. In other words, the design facility may establish a design of corresponding mould, mould part(s), last or last part(s) at the design facility and within seconds initiate manufacturing of the mould, mould part(s), last and/or last part(s) at a different and remote location. This location should typically be close to or at the location where the respective mould and/or last manufacturing locations are close by.

Several 3D design programs establish or render such data directly as an export or standard format applied by the program in question.

Applicable 3D design programs, also referred to as 3D modelling software include, but are not limited to 3D Slash, 3DVIA Shape, AC3D, Adobe Dimension, Alibre Design, Amapi, Anim8or, Animation:Master, ArchiCAD, Art of Illusion, AutoCAD, AutoQ3D Community, AutoQ3D, Autodesk 3ds Max, Autodesk Inventor, Autodesk Maya, Autodesk Mudbox, Autodesk Revit, Autodesk Softimage, Blender, BricsCAD, BRL-CAD, Bryce, CATIA, Carrara, Cheetah3D, Cinema 4D, CityEngine, Clara.io, Cybermotion 3D-Designer, DAZ Studio. DesignSpark Mechanical, Electric Image Animation System, Exa Corporation, Flux, Form-Z, FreeCAD, Geomodeller3D, Hexagon, Houdini, IRONCAD, KeyCreator, LightWave 3D, Makers Empire 3D, MASSIVE, Metasequoia, MikuMikuDance, Milkshape 3D, Modo, NX, Onshape, Open CASCADE, OpenSCAD, Oculus Medium, Paint 3D in Windows 10, Poser, PowerAnimator, Promine, Pro/ENGINEER, Quake Army Knife, Realsoft 3D, Remo 3D, RFEM, Rhinoceros 3D,ScanIP, Sculptris, Seamless3d, SelfCad, Shade 3D, SharkCAD, Silo, Sketchup, Solid Edge, solidThinking, SolidWorks, SpaceClaim, Strata 3D, Sweet Home 3D, Swift 3D, Tekla Structures, Topsolid, TrueSpace, Wings 3D, Wolfram Mathematica, ViaCAD, ZBrush and Zmodeler.

Such 3D modelling software are of course only applicable to the degree that the required last/mould designs can be established and the corresponding descriptive data may be generated directly by such programs or at least via a suitable data transforming software.

In a very advantageous embodiment of the invention said descriptive data may be communicated electronically for instant or at least very fast initiation of printing of last, last parts, mould and/or mould parts at the footwear manufacturing facility.

Such data may be communicated directly via e.g. internal enterprise communication network(s), a VPN connection or e.g. e-mail. Other communication methods may be applied, but it is strongly preferred that the data are transferred by telecommunication means from one location to another. In other words, a fast data transfer is preferred. In a very advantageous embodiment of the invention descriptive data may however be transferred via a public data network.

A very useful advantage which may be obtained through the provisions of the invention is that physical mirroring may be obtained between the design facility and the last/ mould/footwear manufacturing facility in spite of the fact that such facilities may easily be located mutually remote. Even on different continents. A physical mirroring in the present context is understood as the possibility of easily and relatively cheaply manufacturing e.g. last or mould copies at both locations for the purpose of e.g. testing, adjusting or fault correction. In the prior art injection moulding is quite a difficult art to refine and also difficult and complex to initiate for final manufacture of the footwear to be produced by the combined last and mould parts by direct injection production (DIP). Moulds, e.g. aluminium moulds, are extremely expensive to manufacture and mirroring of moulds/lasts are both the design facility and the footwear manufacturing facility is an expensive option and rarely, if ever, applied.

In an embodiment of the invention, said mould descriptive data relating to said direct injection mould inserts may be provided by said design facility.

In an embodiment of the invention, said mould descriptive data relating to said mould may be provided by said design facility and wherein the mould descriptive data are applied to manufacture a further mould/mould insert(s) at said design facility corresponding to said mould/mould insert(s) manufactured a said footwear manufacturing location or said mould manufacturing facility. In such an embodiment of the invention it may be possible to physically check at the design facility whether mould/last and the direct injection machinery physically works and provides the desired shoe design in a proper and intended way.

In an embodiment of the invention, said mould descriptive data relating to said direct injection mould inserts may be provided by said mould manufacturing facility.

In an embodiment of the invention, said direct injection mould inserts may be manufactured by additive manufacturing, e.g. by 3D printing.

Hereby, the inserts may be manufactured using machinery that may be readily available e.g. at various sites, factories, etc. as opposed to CNC machinery, metal casting equipment, etc. Thus, local manufacture will be easier and the manufacture of the inserts may be less costly and may be performed within a relatively small time frame, when using additive manufacturing, e.g. 3D printing or other analogous methods.

Furthermore, it may be possible when utilizing additive manufacturing, e.g. 3D printing, to manufacture forms of e.g. the inserts that may be difficult to manufacture using conventional machinery, e.g. milling or cutting machinery, and/or which may be easier and less costly to produce, when utilizing additive manufacturing.

It is noted that the direct injection mould inserts may be manufactured completely or partly by additive manufacturing, e.g. by 3D printing, for example in case the additive manufacturing is made on basis of parts that have been provided in advance as e.g. standard parts.

3D printing may be performed by conventional 3D printers commercially available or 3D printers customized and optimized for the purpose.

Suitable and applicable 3D printer manufacturers includes, but are not limited to, Stratasys, HP, Origin, 3D Systems, Formlabs, Zortrax, Prusa, Wanhao, Creality, FlashForge, digital Metal, ExOne, SLM Solutions and Arcam EMB.

In an embodiment of the invention, said basic direct injection mould may be configured for accommodating a range of different sizes and/or designs of said direct injection mould inserts and wherein said mould descriptive data may comprise data concerning the size of said basic direct injection mould.

Hereby, it may be possible to reduce the necessary number of basic direct injection moulds that are required to manufacture a range of sizes and/or footwear designs, e.g. in that a particular basic direct injection mould may be used for a variety of sets of direct injection mould inserts.

In an embodiment of the invention, said basic direct injection mould and said direct injection mould inserts may comprise mutually engaging coupling means.

Hereby, the direct injection mould inserts may be allocated to be used in connection with one (or more) particular basic direct injection mould(s) only, e.g. a basic direct injection mould that has coupling means that match the coupling means on the direct injection mould inserts. Thus, it may be ensured that e.g. a set of direct injection mould inserts are not by accident combined with the wrong basic direct injection mould, which may be intended for a completely different footwear design, make, etc.

Further optional advantages may be achieved.

In an embodiment of the invention, said mould descriptive data may comprise information relating to said mutually engaging coupling means.

Hereby, it may be ensured that e.g. when the direct injection mould inserts are made locally, these may be manufactured to correspond to the e.g. basic direct injection mould(s) that is(are) already at the locality.

In an embodiment of the invention, said coupling means may be footwear design specific, customer specific and/or footwear manufacturing facility specific.

Hereby, it may be possible to ensure a correct match between e.g. basic direct injection mould and inserts that are intended to be utilized in connection with a particular footwear design and avoid that e.g. inserts intended for another footwear design are inadvertently used in connection with a basic direct injection mould for the particular footwear design, which might cause erroneously moulded soles.

Furthermore, it may be possible to ensure that a particular footwear manufacturing facility receives insert design data (or ready-made inserts) that are customized to the particular needs of the footwear manufacturing facility and, due to the specific coupling means, may only be used in connection with the e.g. basic direct injection moulds that have been provided to the particular footwear manufacturing facility.

Even further, it may be possible to ensure that inserts, e.g. mould descriptive data, are provided to a particular customer with the characteristics required by particular customer, e.g. customized to the particular needs of the customer. Due to the specific coupling means, the provided inserts may only be used in connection with the e.g. basic direct injection moulds that have been provided to the particular customer.

In an embodiment of the invention, said mutually engaging coupling means may comprise, at each contact surface of the inserts and each mating contact surface of the basic direct injection mould, at least one depression in and at least one protruding part of the contact surface, arranged such that the mutually engaging coupling means at the mating contact surfaces are matching each other.

Hereby, it may be possible to provide a multitude of combinations of different coupling means which may ensure that insertion of a "wrong" set of inserts in a basic direct injection mould is prohibited. Furthermore, by having depressions as well as protrusions it may be prevented that any easy modification of e.g. insert coupling means or basic direct injection mould coupling means may be attempted or made to allow an unintended or un-authorized coupling to be effected e.g. at a footwear manufacturing facility.

To this can be added that the coupling means may be varied in numerous other manners, e.g. by having different lengths, widths, linear/non-linear configurations, different locations in the vertical direction, etc., which further enlarges the number of possible combinations.

Even further, it may be possible, when configuring the combinations of different coupling elements, to enhance the stability of the first and the second side inserts, when mounted in the basic direct injection mould and e.g. when the mould is being closed and e.g. when the injected material is being formed. The coupling elements may thus transfer stability to the side inserts from the basic direct injection mould.

In an embodiment of the invention, said additive manufacturing materials, e.g. printing materials, utilized by said additive manufacturing, e.g. 3D printing may comprise one or more polymers.

In an embodiment of the invention, said additive manufacturing materials, e.g. printing materials, utilized by said additive manufacturing, e.g. 3D printing may comprise one or more photopolymers It should be noted that additive manufacturing materials in the present context thus in practice will refer to the material by means of which last, last parts, mould and or moulds parts are 3D printed.

In an embodiment of the invention, additive manufacturing materials, e.g. printing materials, utilized by said additive manufacturing, e.g. 3D printing, may comprise one from the list comprising polymers, resin photopolymers, ABS, PLA, ASA, nylon/nylon powder, PETG, metal/metal powder, plaster powder, HIPS, PET, PEEK, PVA, ULTEM, polyjet resin and/or ceramics and any combination thereof.

Hereby, it is possible to make advantage of a flexible material that do not break as easy as a rigid material. The heating may not be fully homogeneous e.g. from the bottom part the material may initially bend and in order not to break, the material should be able to withstand these inhomogeneous heating procedures.

In an embodiment of the invention, said additive manufacturing material, e.g. printing material, utilized by said additive manufacturing, e.g. 3D printing may comprise a material, that when cured, provides a surface that is adhesion defiant to the injected material.

Hereby, the moulding of the shoe soles may be made with less risk of faults due to e.g. injection material sticking to the inserts and the manufactured soles may be of a higher quality as regards the finish. Furthermore, it may be possible to reduce or even avoid application of anti-stick agents, lubrication or the like to the surfaces of the inserts, when using such materials that is adhesion defiant in relation to the injected material.

In an embodiment of the invention, said materials may comprise a reinforcement material.

Hereby, the manufactured elements may be provided with improved qualities such as improved strength, rigidity, durability and/or other characteristics, when the material comprises a reinforcement material such as carbon fibres, glass fibres or other types of materials.

In an embodiment of the invention, the last descriptive data relating to said last corresponding to said footwear design may be provided to the last manufacturing facility and/or the footwear manufacturing facility by means of a public data network.

In an embodiment of the invention said adhesion defiance may be obtained by use of
  polyurethane as injection material and
  additive manufacturing material.

Additive manufacturing material generally refers to the material by means of which last, last parts, mould and/or mould parts are manufactured. Additive manufacturing material may thus typically within the context of the present invention refer to the materials by means of which last, last parts, mould and/or mould parts are manufactured are 3D-printed/additively manufactured.

In an embodiment of the invention said adhesion defiance is obtained by use of
  polyurethane as injection material and
  one or more polymers as additive manufacturing material.

In an embodiment of the invention said adhesion defiance may be obtained by use of
  polyurethane as injection material and
  one or more photopolymers as additive manufacturing material.

In an embodiment of the invention, said adhesion defiance may be obtained by use of
  polyurethane as injection material and/or
  additive manufacturing material, e.g. 3D material including the following, resin photopolymers, ABS, PLA, ASA, nylon/nylon powder, PETG, metal/metal powder, plaster powder, HIPS, PET, PEEK, PVA, ULTEM, polyjet resin and/or ceramics.

It should be noted that the above use of polyurethane as injection material also may, to the degree that the direct injection process will allow it, be supplemented or substituted with rubber, e.g. natural or synthetic rubber completely or partly as direct injection material.

Natural rubber may e.g. be defined and understood according to the below explanations and may also be called India rubber or caoutchouc, as initially produced, comprises of polymers of the organic compound isoprene, with minor impurities of other organic compounds, plus water. Thailand and Indonesia are two of the leading rubber producers. Forms of polyisoprene that are used as natural rubbers are classified as elastomers.

Currently, rubber is harvested mainly in the form of the latex from the rubber tree or others. The latex is a sticky, milky colloid drawn off by making incisions in the bark and collecting the fluid in vessels in a process called "tapping". The latex then is refined into rubber ready for commercial processing. In major areas, latex is allowed to coagulate in the collection cup. The coagulated lumps are collected and processed into dry forms for marketing.

Natural rubber is used extensively in many applications and products, either alone or in combination with other materials. In most of its useful forms, it has a large stretch ratio and high resilience, and is extremely waterproof.

Synthetic rubber is also well-known to the skilled person and may e.g. be understood according to the below explanation.

Like other polymers, synthetic may be made from various petroleum-based monomers. The most prevalent synthetic rubbers may be styrene-butadiene rubbers (SBR) derived from the copolymerization of styrene and 1,3-butadiene. Other synthetic rubbers are prepared from isoprene (2-methyl-1,3-butadiene, yielding polyisoprene), chloroprene (2-chloro-1,3-butadiene), and isobutylene (methylpropene) with a small percentage of isoprene for cross-linking (this product is called butyl rubber). These and other monomers can be mixed in various proportions to be copolymerized to produce products with a range of physical, mechanical, and chemical properties. The monomers can be produced pure, and the addition of impurities or additives can be controlled by design to give optimal properties.

Polymerization of pure monomers can be better controlled to give a desired proportion of cis and trans double bonds.

Manufacturing technologies that may be used comprises Digital Light Processing (DLP), Stereolithography (SLA), Fused Deposition Modeling (FDM), Selective Laser Sintering (SLS), Material Jetting (MJ), Drop on Demand (DOD), Sand Binder Jetting, Metal Binder Jetting, direct Metal Laser Sintering (DMLS), Selective Laser Melting (SLM), Electron Beam Melting (EBM), LCD, polyjet and/or jet fusion.

In an embodiment of the invention, said injecting moulding equipment may comprise parts, e.g. the basic direct injection mould, made of aluminium.

In an embodiment of the invention, said manufacturing may be made by the system operating as a distributed machine, comprising distributed operations at the design facility location, the mould manufacturing location, the last manufacturing location and the footwear manufacturing location.

Hereby, the manufacture of the equipment and the footwear may be made in an efficient manner, even when the distributed locations are widely spread, e.g. in different regions, in different cities, in different countries, in different continents, etc. and whereby the necessary time for performing e.g. start-up of production of a new design, change of production ranges, etc. may be considerably reduced as compared to prior art systems, which rely on e.g. transport of moulds from mould manufacturer to footwear manufacturer and back again in case of adjustments or corrections.

In an embodiment of the invention, said design facility (DF) may be connected to said mould manufacturing facility (MMF), to said last manufacturing facility (LMF) and/or to said footwear manufacturing facility (FMF) via a communication line and wherein said communication line may be used for digital transmission of for example error reports from the mould manufacturing facility (MMF) and/or from the footwear manufacturing facility (FMF) to the design facility (DF).

Hereby, the transmission of possible errors that may arise during manufacturing can rapidly be detected and corrected.

It is furthermore noted that said communication line or lines may serve for digital transmission, e.g. from the design facility to the mould manufacturing facility or the footwear manufacturing facility concerning e.g. mould descriptive data relating to direct injection mould inserts.

In an embodiment of the invention, last descriptive data relating to said last corresponding to said footwear design may be provided and wherein said last descriptive data may be communicated to said last manufacturing facility located at a last manufacturing location or to said at least one footwear manufacturing facility and utilized in providing a last corresponding to said footwear design.

In an embodiment of the invention, said last descriptive data relating to said last may be provided by said design facility.

In an embodiment of the invention, said last descriptive data relating to said last may be provided by said last manufacturing facility.

In an embodiment of the invention, said last may be manufactured by additive manufacturing, e.g. by 3D printing.

In an embodiment of the invention, said last may comprise
 a last body, said last body having a side wall with an outer surface having at least partly a shape of a human foot and an inner surface defining an inner volume of the last body, and
 an attachment structure attachable to a footwear manufacturing device.

In an embodiment of the invention, said last body may comprise at least one support structure extending from an internal surface of the last body to an opposing internal surface of the last body.

In an embodiment of the invention, said attachment structure may be located at a top part of the last body.

In an embodiment of the invention, said attachment structure and said footwear manufacturing device may be configured with mutually engaging last coupling elements.

In an embodiment of the invention, said last coupling elements of said footwear manufacturing device may be arranged at a last holder.

In an embodiment of the invention, said last descriptive data may comprise information relating to said mutually engaging last coupling elements.

Hereby, it may be ensured that e.g. when the lasts are made locally, these may be manufactured to correspond to the footwear manufacturing device e.g. a last holder that is actually at the locality.

In an embodiment of the invention, said mutually engaging last coupling elements may be footwear design specific, customer specific and/or footwear manufacturing facility specific.

Hereby, it may be possible to ensure a correct match between e.g. a last holder and a last that is intended to be utilized in connection with a particular footwear design and avoid that e.g. lasts intended for another footwear design are inadvertently used in connection with an e.g. last holder for the particular footwear design, which might cause e.g. erroneously moulded soles.

Furthermore, it may be possible to ensure that a particular footwear manufacturing facility receives last descriptive data (or ready-made lasts) that are customized to the particular needs of the footwear manufacturing facility and, due to the specific coupling elements, may only be used in connection with the e.g. last holder that has been provided to the particular footwear manufacturing facility.

Even further, it may be possible to ensure that lasts, e.g. last descriptive data, are provided to a particular customer with the characteristics required by particular customer, e.g. customized to the particular needs of the customer. Due to the specific coupling elements, the provided lasts may only be used in connection with the e.g. last holder that has been provided to the particular customer.

In an embodiment of the invention, a thermal conductive medium such as thermal conductive paste may be applied between the direct injection mould inserts and corresponding contact surfaces of the basic direct injection mould.

Hereby, it may be achieved that the heat transfer between the e.g. aluminium of the basic direct injection mould and the e.g. polymer material of the inserts may be improved considerably, thus providing better thermal conditions when performing the direct injection moulding of the footwear sole, in particular in the start-up phase, where the temperature of the inserts may not have reached an optimal level.

In an embodiment of the invention, the mould descriptive data corresponding to said footwear design may be provided to the mould manufacturing facility and/or the footwear manufacturing facility by means of a public data network.

In an embodiment of the invention, said last may comprise a movable heel body.

Hereby, it may be achieved that it may be easier to mount footwear uppers on the last and subsequently to remove uppers, e.g. an upper to which a sole has been attached, from the last, as the heel body is movably attached to the rear part of the last body.

In an embodiment of the invention the direct injection mould insert(s) may comprise side insert(s) having an insert lip, wherein the insert lip comprises an upper contacting surface for contacting the outer surface of a footwear upper and a connecting end connected to the respective side insert.

The insert lip may be integral with the respective side insert.

The lip may have a height $h2$ at the connecting end of the lip that is larger than the height $h1$ at the upper contacting surface of the lip, relative to a normal A of the upper contacting surface. The normal A of the upper contacting surface is configured to intersect a centre point of the upper contacting surface seen in the height direction.

The lip may have a length $l1$ defined by the distance from the upper contacting surface to the connecting end along the normal A of the upper contacting surface.

In one exemplary embodiment the length of the lip $l1$ may have size that is at least larger than the height $h2$, i.e. that the length ratio between the length of the lip vs. the height $h2$ is at least 1:1. In another embodiment the length of the lip may have a size that is smaller than the height $h2$, i.e. $l1<h2$. Thus, the height $h2$ provides support for the length of the lip, where the height $h2$ of the lip may have to be increased when the length $l1$ is increased.

In an embodiment of the invention the upper contacting surface may have a height $h1$ in the range of 2-6 mm and/or wherein the connecting end may have a height $h2$ in the range of 6-15 mm.

More specifically, the height $h1$ may be between 3 and 5 mm, or even more specifically around 4 mm. Preferably, the height $h1$ may be above 2 mm, as a lower thickness may cause the material to bend, deform or warp during injection. This may especially be in a situation where the mould insert is 3D printed from e.g. a polymeric material.

More specifically, the height $h2$ may be between 7 and 12 mm, where the height may more specifically be between 5-8 and 10 mm. The increased height $h2$ provides support to the lip especially when the material is 3D printed from e.g. a polymeric material.

In one embodiment the size ratio between the height $h1$ and $h2$ may be around 1:2, where $h2$ may be twice the height of $h1$. In one embodiment the size ratio may be around 1:1.5, where the height $h2$ is 50% larger than $h1$.

The invention further relates to a system for manufacturing footwear, which system utilizes equipment for a direct injection production (DIP) of footwear, wherein said equipment is manufactured by a system for manufacturing equipment for a direct injection production (DIP) of footwear.

Manufacturing of footwear by means of DIP in the present context may e.g. be performed by means of direction injection process equipment e.g. provided by the machine supplier Desma, e.g. by means of rotary table setups.

The invention further relates to a method of manufacturing footwear by direct injection production (DIP) at at least one footwear manufacturing facility located at a footwear manufacturing location, wherein said method includes providing at least one mould that is configured for direct injection production of footwear, wherein said method comprises providing a footwear design by a design facility located at a design facility location, manufacturing a mould corresponding to said footwear design by a mould manufacturing facility located at a mould manufacturing location, said mould being configured for direct injection moulding of a sole part of said footwear, wherein said mould comprises a basic direct injection mould, which is attachable to injection moulding equipment and is configured for at least partly channelling injection material to a mould cavity, said basic direct injection mould further being configured for accommodating direct injection mould inserts to further define said mould cavity, manufacturing a last corresponding to said footwear design by a last manufacturing facility located at a last manufacturing location, providing mould descriptive data relating to said direct injection mould inserts corresponding to said footwear design, communicating said mould descriptive data to the at least one footwear manufacturing facility for manufacturing of said direct injection mould inserts at said footwear manufacturing location or manufacturing said direct injection mould inserts at said mould manufacturing facility, based on said mould descriptive data, and transporting the direct injection mould inserts to said at least one footwear manufacturing facility, combining said direct injection mould inserts with said basic direct injection mould to provide said mould corresponding to said footwear design at said footwear manufacturing location, and manufacturing at least one piece of footwear according to said footwear design by the at least one footwear manufacturing facility located at the footwear manufacturing location, whereby said last corresponding to said footwear design and said mould corresponding to said footwear design are utilized.

Hereby, it may be possible to provide the direct injection mould, ready to be used, at the footwear manufacturing facility in a more cost-efficient and faster manner, e.g. by having a basic direct injection mould already at the footwear manufacturing facility and mounting direct injection mould inserts corresponding to a desired design, which direct injection mould inserts may be relatively quickly and cost-efficiently made locally at the at least one footwear manufacturing facility, based on descriptive data requested and communicated from e.g. the mould manufacturing facility or the design facility. Thus, in case there is need for correction or adjustment of the design of the footwear, correction or adjustment at the start-up of a footwear design production, e.g. due to less than optimal correspondence between last and direct injection mould inserts, etc., return transport of the relatively large mould to the mould manufacturing facility and transport of a corrected mould to the footwear manufacturing facility may be avoided and instead, the locally made direct injection mould inserts may simply be discarded (or possibly returned as documentation only) and new inserts may be made locally, e.g. at the footwear manufacturing facility, based on corrected or adjusted mould descriptive data relating to the mould inserts, and inserted in the basic direct injection mould.

Alternatively, the new, corrected or adjusted, inserts may be made at the mould manufacturing facility and be transported to the footwear manufacturing facility, which also entails that a costly transport, adjustment and return transport of a mould with integrated inner mould surfaces can be avoided and furthermore, it may be achieved that the adjustment or correction can be made quicker, e.g. since the manufacture of the new inserts may be made relatively quickly, based on adjusted descriptive insert data, no matter whether this takes place at the mould manufacturing facility or locally, e.g. at the footwear manufacturing facility.

Furthermore, similar advantages may be achieved when manufacture is changed from one footwear design to another, from one size to another or in analogous circumstances, where new inserts may quickly and cost-efficiently be provided and combined with the basic direct injection mould and where the previously used inserts may be stored for subsequent use or discarded.

Also, it is noted that in case of any wear on the inserts that go beyond acceptable tolerances, the inserts may quickly and cost-efficiently be exchanged for new ones. This may be of importance for example in cases where the inserts have been made of material that has less wear resistance than conventionally used mould materials, e.g. metal, aluminium.

Thus, in general it will be seen that a more efficient manufacturing may be possible, where e.g. downtime may be avoided or at least reduced significantly as opposed to the prior art methods.

It is noted that as regards the basic direct injection mould, which can be attached to injection moulding equipment and is configured for channelling injection material to a mould cavity, it may be seen as being a moulding apparatus in itself, e.g. in that injection material may be injected from the injection moulding equipment via one or more channels and that the injected material via the one or more channels in the basic direct injection mould may be guided to a mould cavity defined by the basic direct injection mould itself. Further, though, by means of the direct injection mould inserts the mould cavity may be further defined, e.g. by providing mould surfaces covering at least partly the inner surfaces of the basic direct injection mould, and where e.g. a shoe upper may define the remaining mould surface.

In an embodiment of the invention, said mould descriptive data relating to said direct injection mould inserts may be provided by said design facility.

In an embodiment of the invention, said mould descriptive data relating to said direct injection mould inserts may be provided by said mould manufacturing facility.

In an embodiment of the invention, said direct injection mould inserts may be manufactured by additive manufacturing, e.g. by 3D printing.

Hereby, the inserts may be manufactured using machinery that may be readily available e.g. at various sites, factories, etc. as opposed to CNC machinery, metal casting equipment, etc. Thus, local manufacture will be easier and the manufacture of the inserts may be less costly and may be performed within a relatively small time frame, when using additive manufacturing, e.g. 3D printing or other analogous methods.

Furthermore, it may be possible when utilizing additive manufacturing, e.g. 3D printing, to manufacture forms of e.g. the inserts that may be difficult to manufacture using conventional machinery, e.g. milling or cutting machinery, and/or which may be easier and less costly to produce, when utilizing additive manufacturing.

It is noted that the direct injection mould inserts may be manufactured completely or partly by additive manufacturing, e.g. by 3D printing, for example in case the additive manufacturing is made on basis of parts that have been provided in advance as e.g. standard parts.

In an embodiment of the invention, the step of combining the direct injection mould inserts with the basic direct injection mould to provide said mould may comprise application of a thermal conductive medium such as thermal conductive paste.

Hereby, it may be achieved that the heat transfer between the e.g. aluminium of the basic direct injection mould and the e.g. polymer material of the inserts may be improved considerably, thus providing better thermal conditions when performing the direct injection moulding of the footwear sole, in particular in the start-up phase, where the temperature of the inserts may not have reached an optimal level.

In an embodiment of the invention, the method may further comprise the step of
  providing last descriptive data relating to said last corresponding to said footwear design,
  communicating the last descriptive data to said last manufacturing facility located at a last manufacturing location or to said at least one footwear manufacturing facility, wherein
  the last descriptive data are utilized in providing a last corresponding to said footwear design.

In an embodiment of the invention, said last descriptive data relating to said last may be provided by said design facility.

In an embodiment of the invention, the method may further comprise the step of manufacturing said last by additive manufacturing, e.g. by 3D printing.

Hereby, the last may be manufactured using machinery that may be readily available e.g. at various sites, factories, etc. as opposed to CNC machinery, metal casting equipment, etc. Thus, local manufacture will be easier and the manufacture of the last may be less costly and may be performed within a relatively small time frame, when using additive manufacturing, e.g. 3D printing or other analogous methods.

Furthermore, it may be possible when utilizing additive manufacturing, e.g. 3D printing, to manufacture forms of e.g. the lasts that may be difficult to manufacture using conventional machinery, e.g. milling or cutting machinery, and/or which may be easier and less costly to produce, when utilizing additive manufacturing.

It is noted that it will be understood that the direct injection lasts may be manufactured completely or that only one or more part of the lasts may be made by additive manufacturing, e.g. by 3D printing. This may for example be the case when the additive manufacturing is made on basis of parts that have been provided in advance as e.g. standard parts, or when the additive manufacturing is related to a subpart of the last.

In an embodiment of the invention, the method may further utilize a system.

It is noted that according to further aspects of the disclosure, direct injection mould inserts as well as (parts of) the basic direct injection mould may be made by e.g. additive manufacturing, 3D printing or the like, and that even a mould with integrated moulding surfaces may be made by e.g. additive manufacturing, 3D printing or the like, for example ready to be attached to injection moulding equipment. Thus, such parts, e.g. moulds, may be made at a mould manufacturing facility or at (or in a locality near) said at least one footwear manufacturing facility, based on said mould descriptive data that may be communicated from said design facility. In accordance with such aspects, the various embodiment as disclosed in connection with the other aspects disclosed in the present application may be utilized as well.

THE FIGURES

Figure 2:
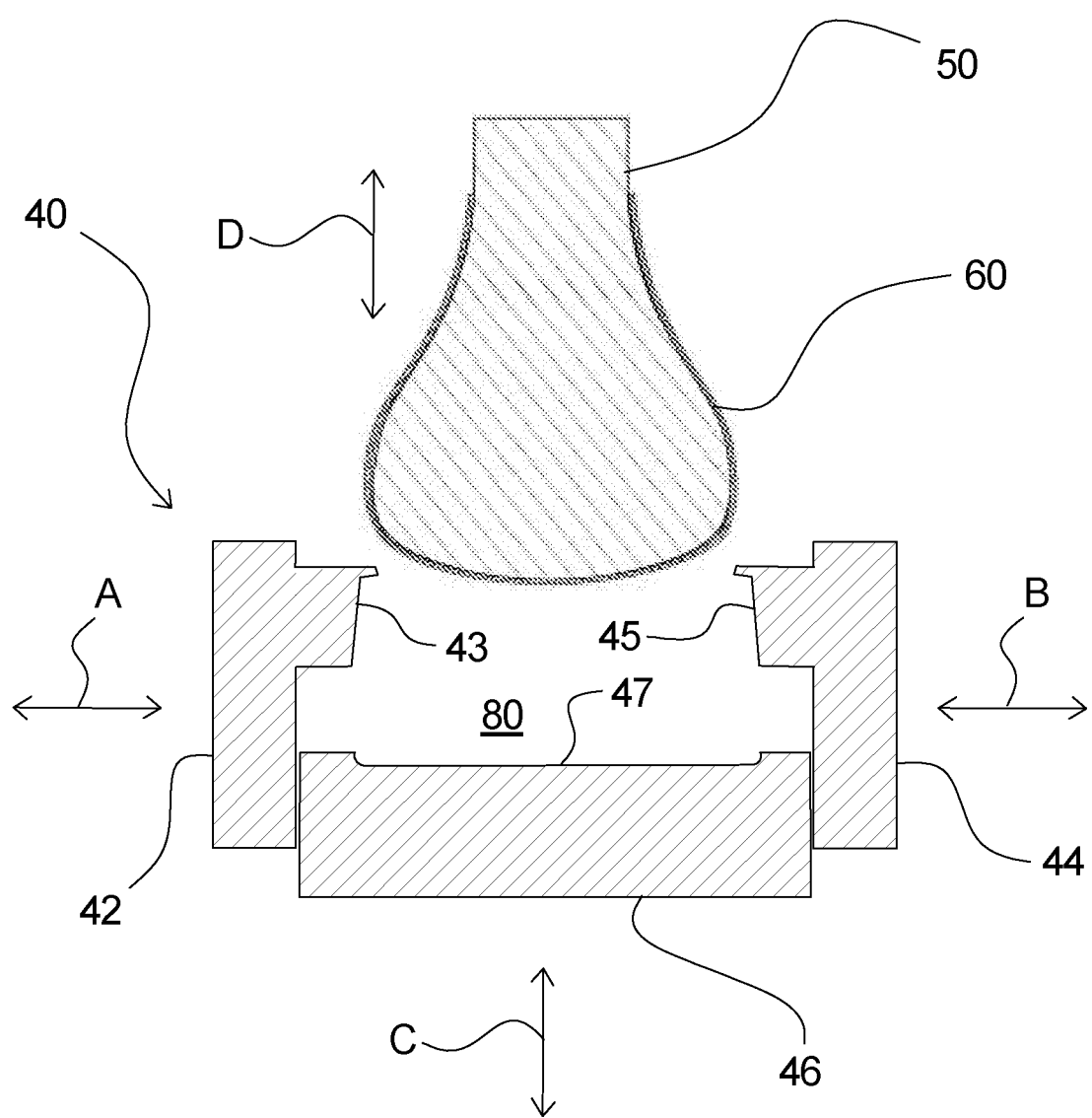
Figure 3:
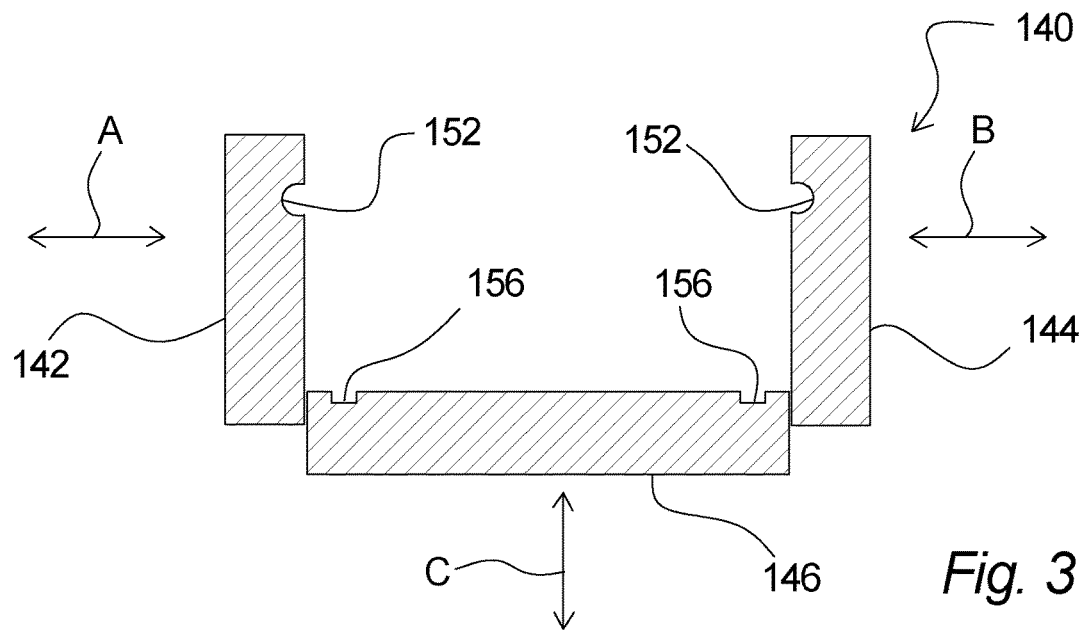
Figure 4:
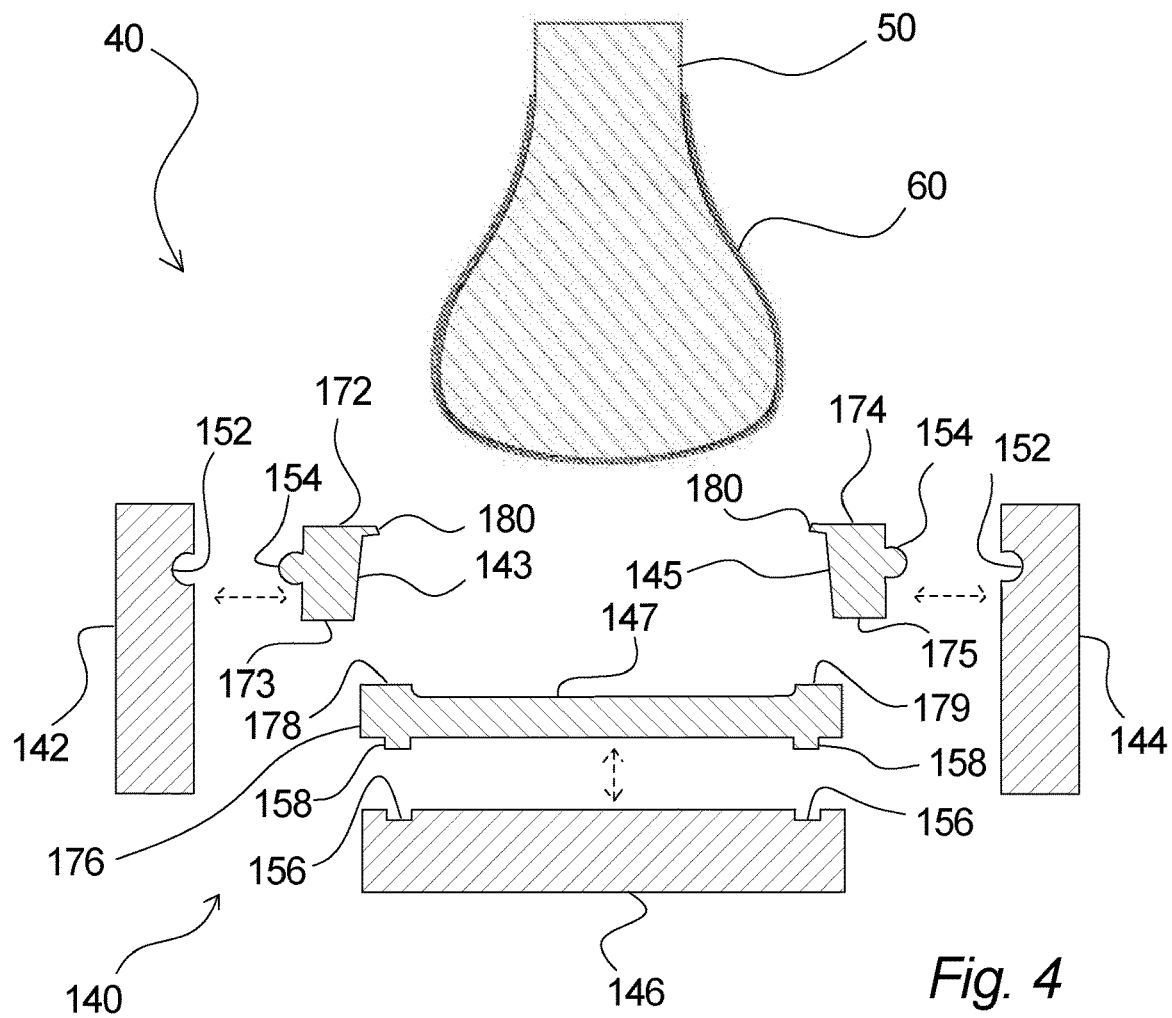
Figure 7:
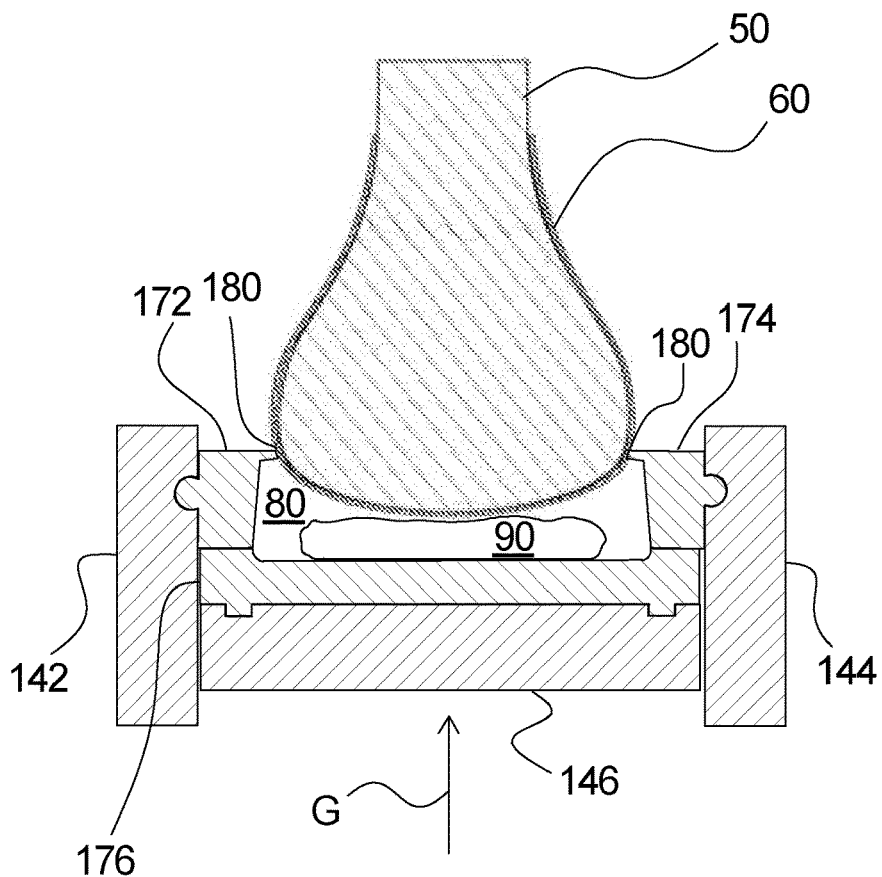
Figure 8:
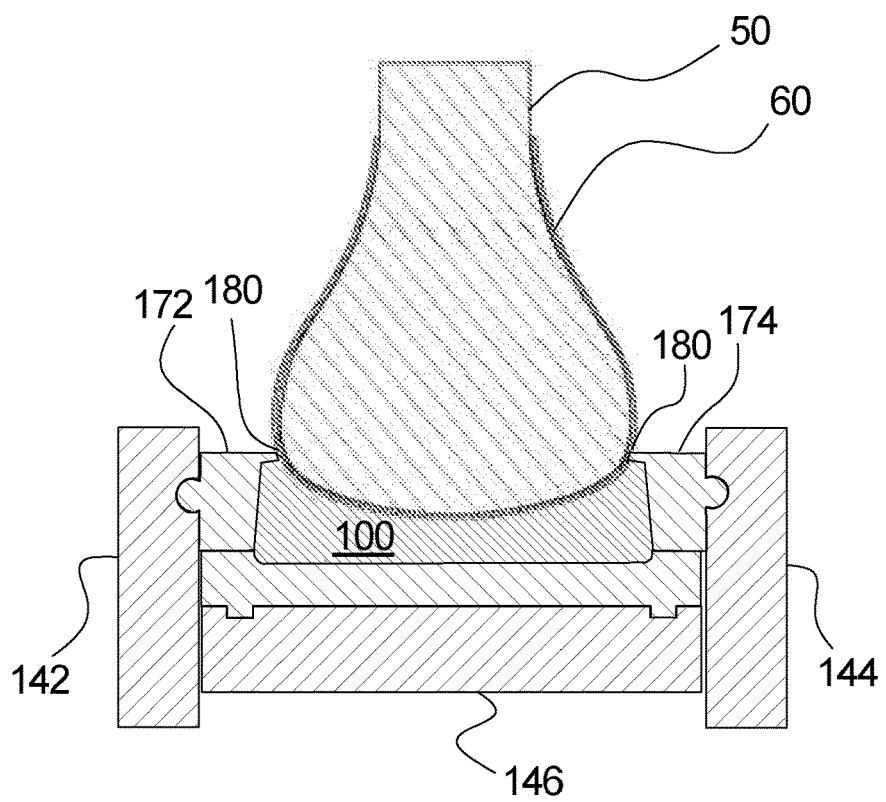
Figure 9:
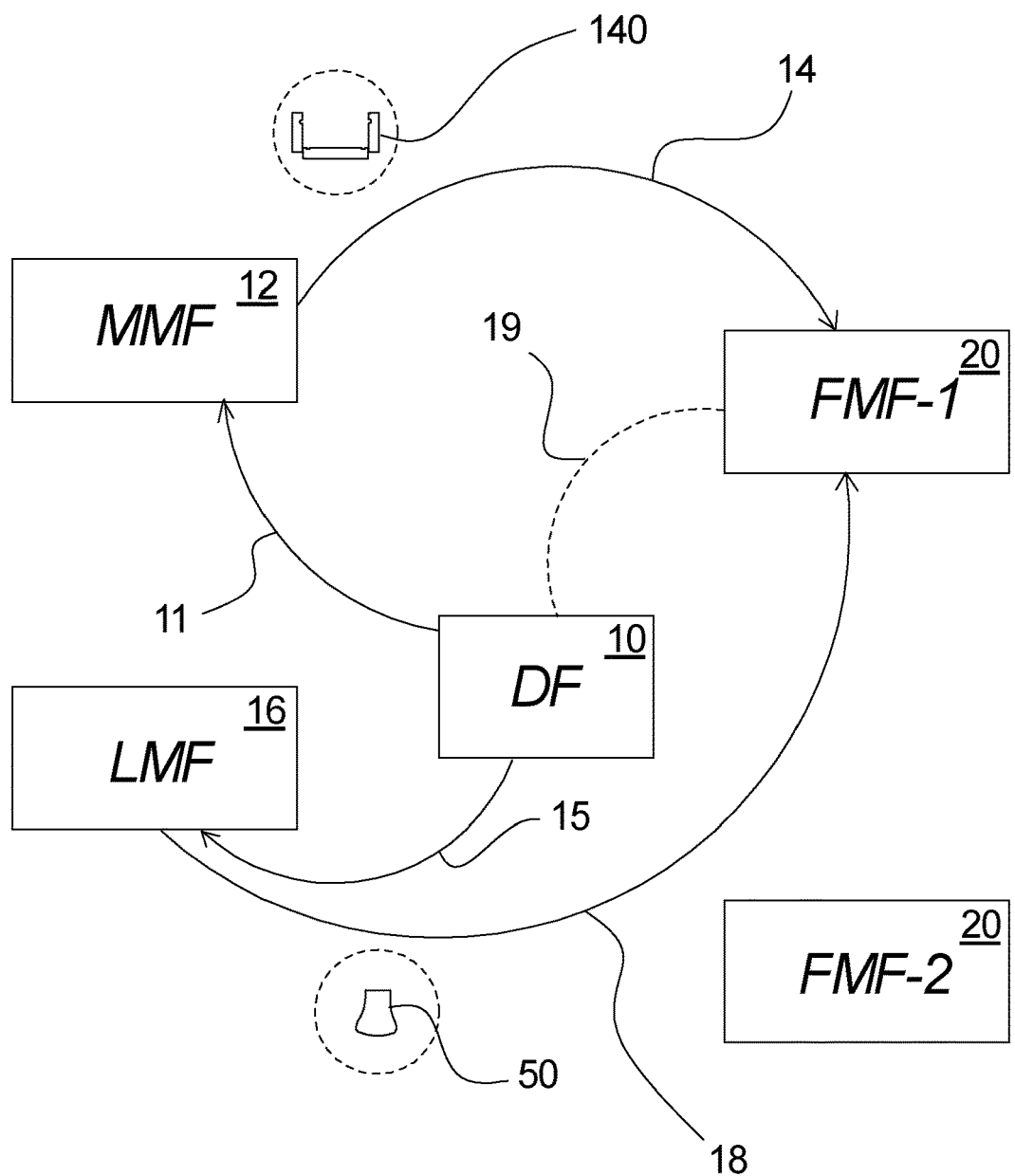
Figure 10:
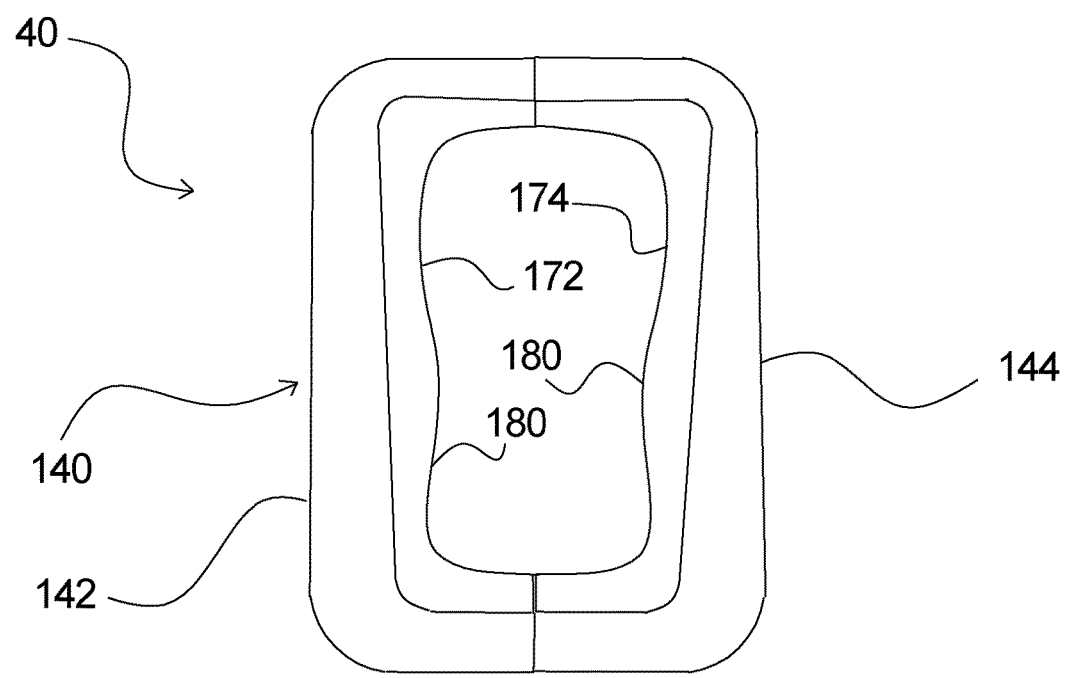
Figure 11:
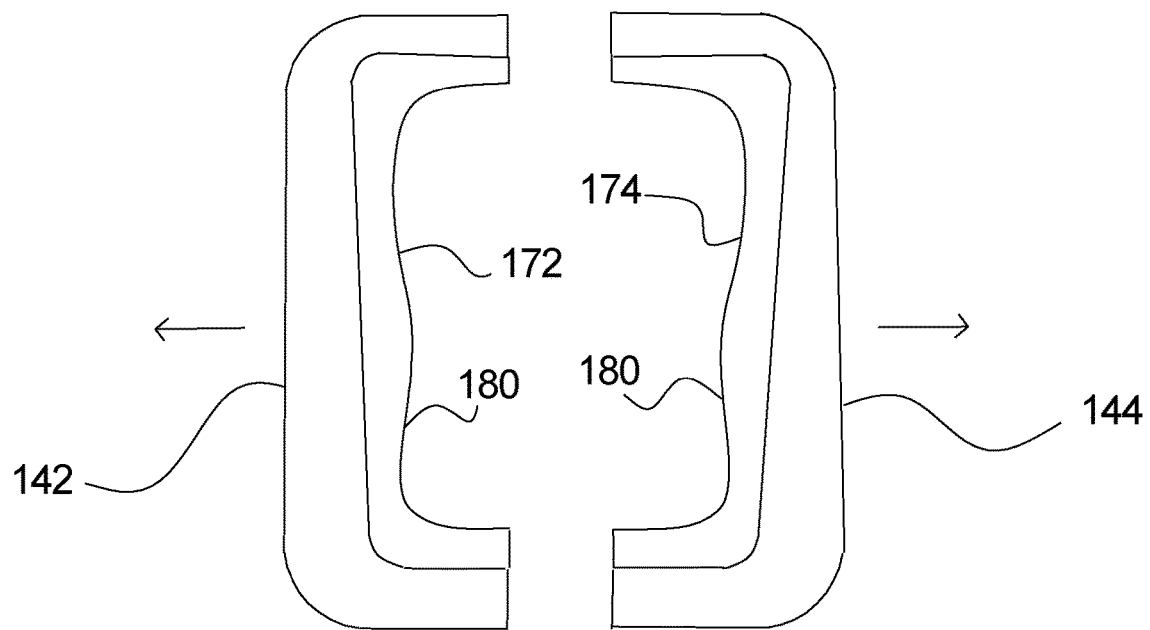
Figure 12:
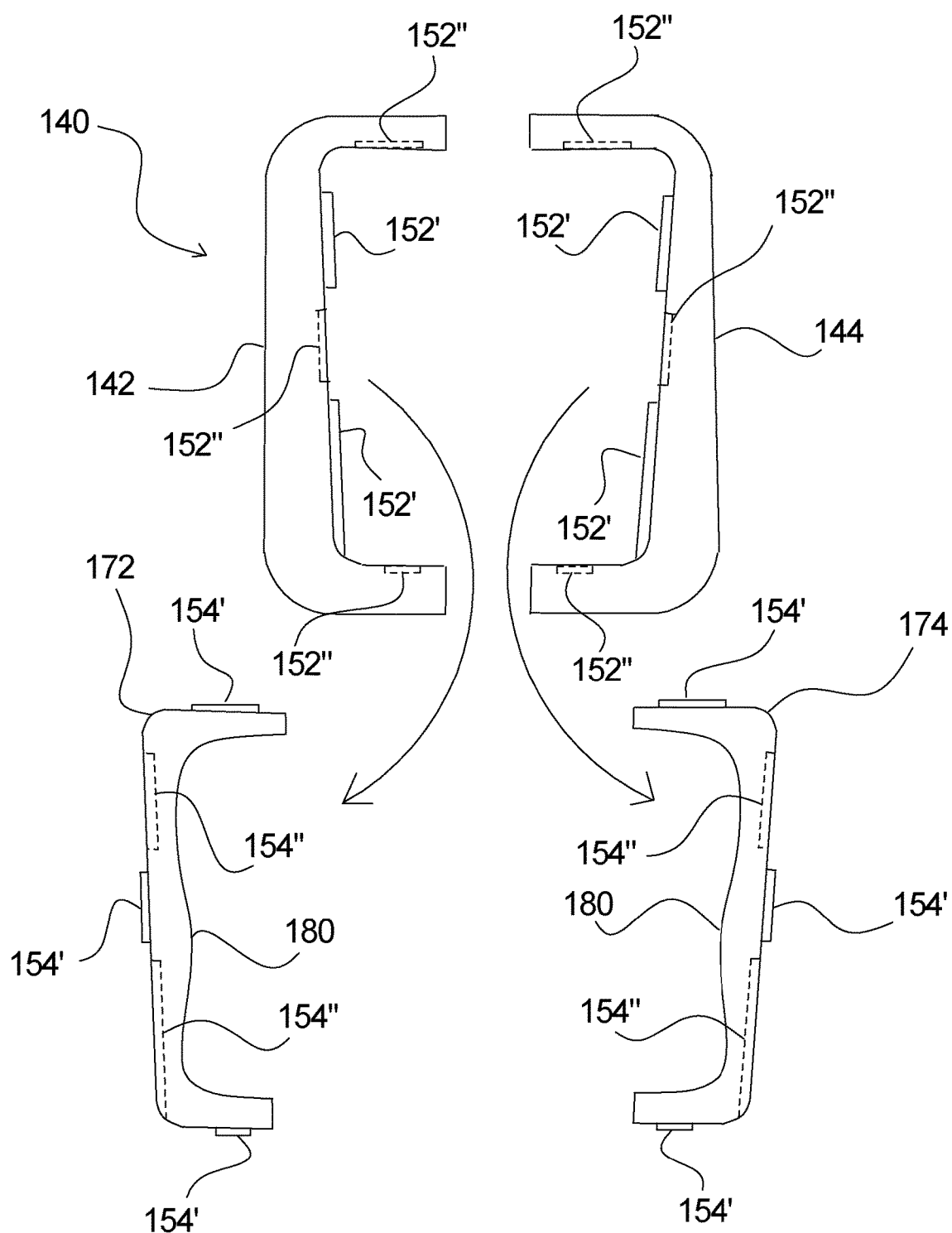
Figure 13:
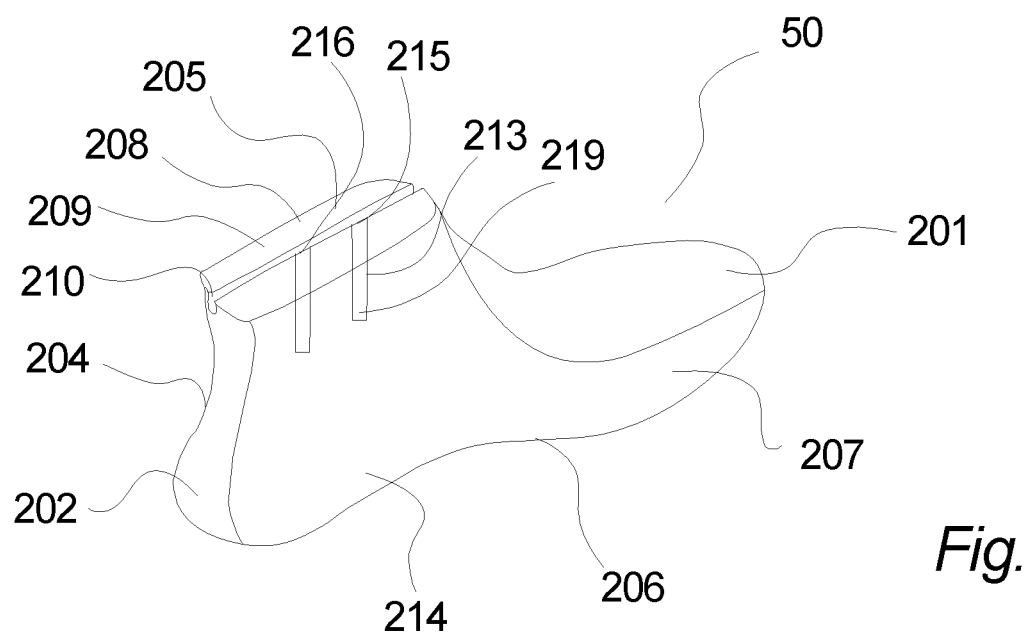
Figure 14:
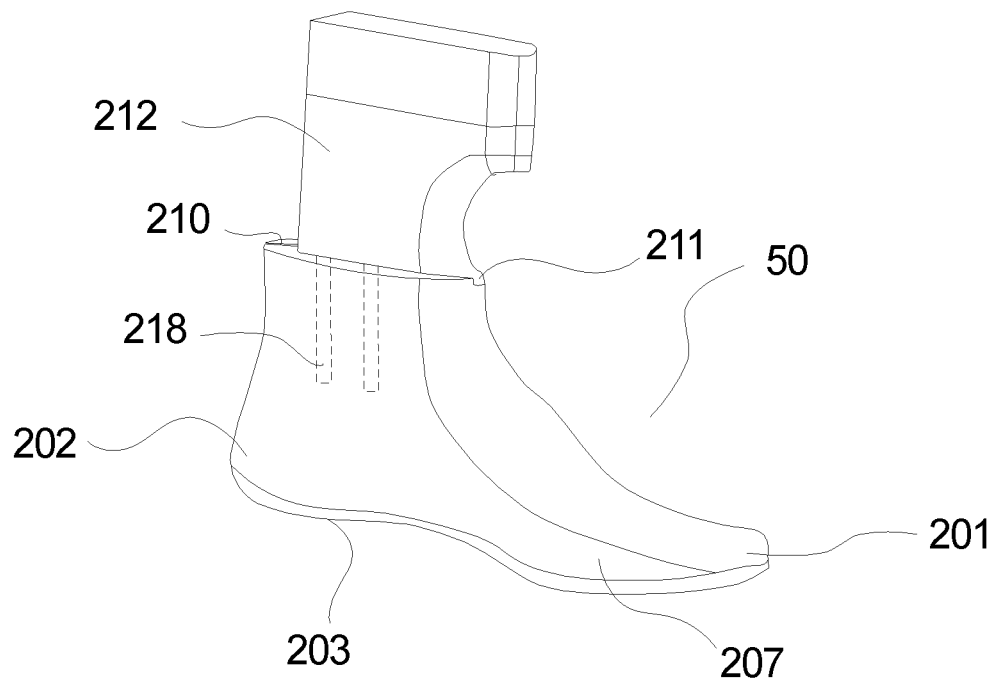
Figure 15A:
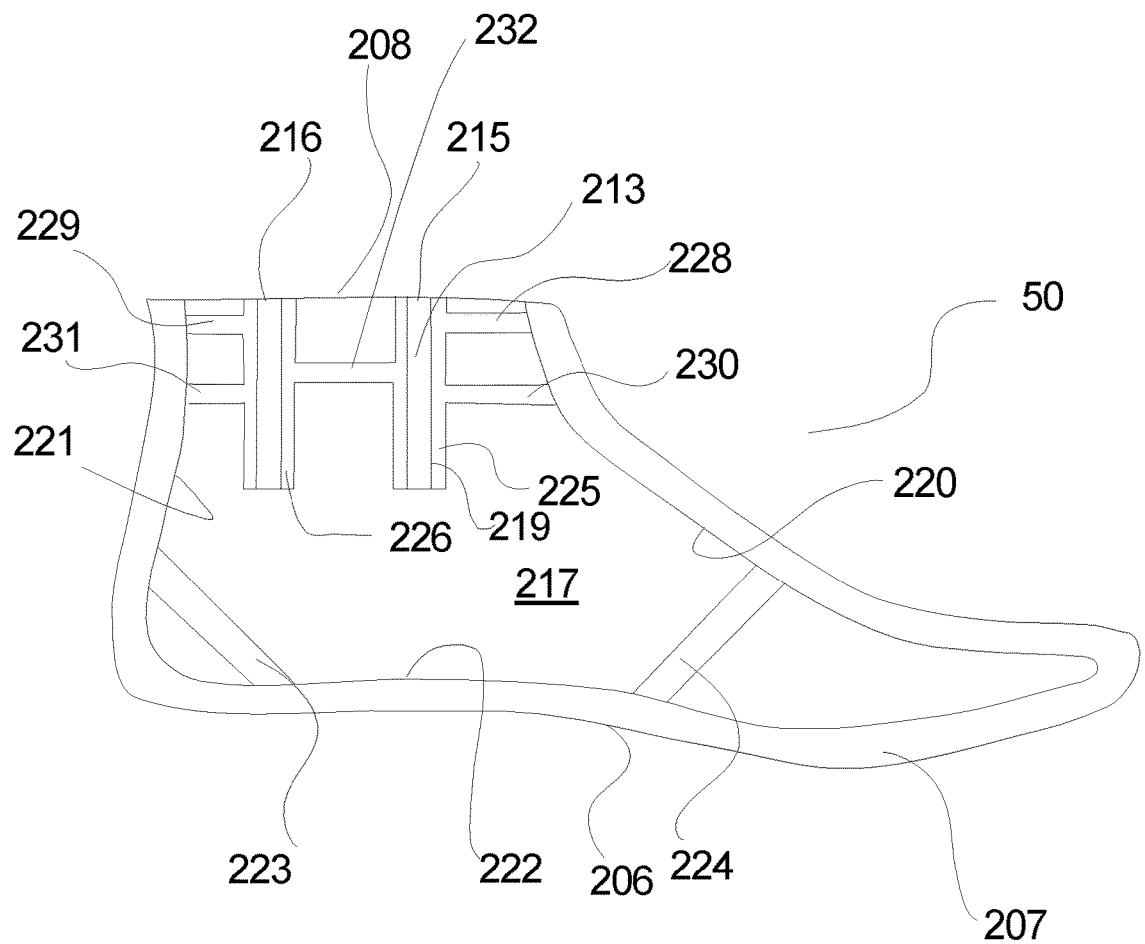
Figure 15B:
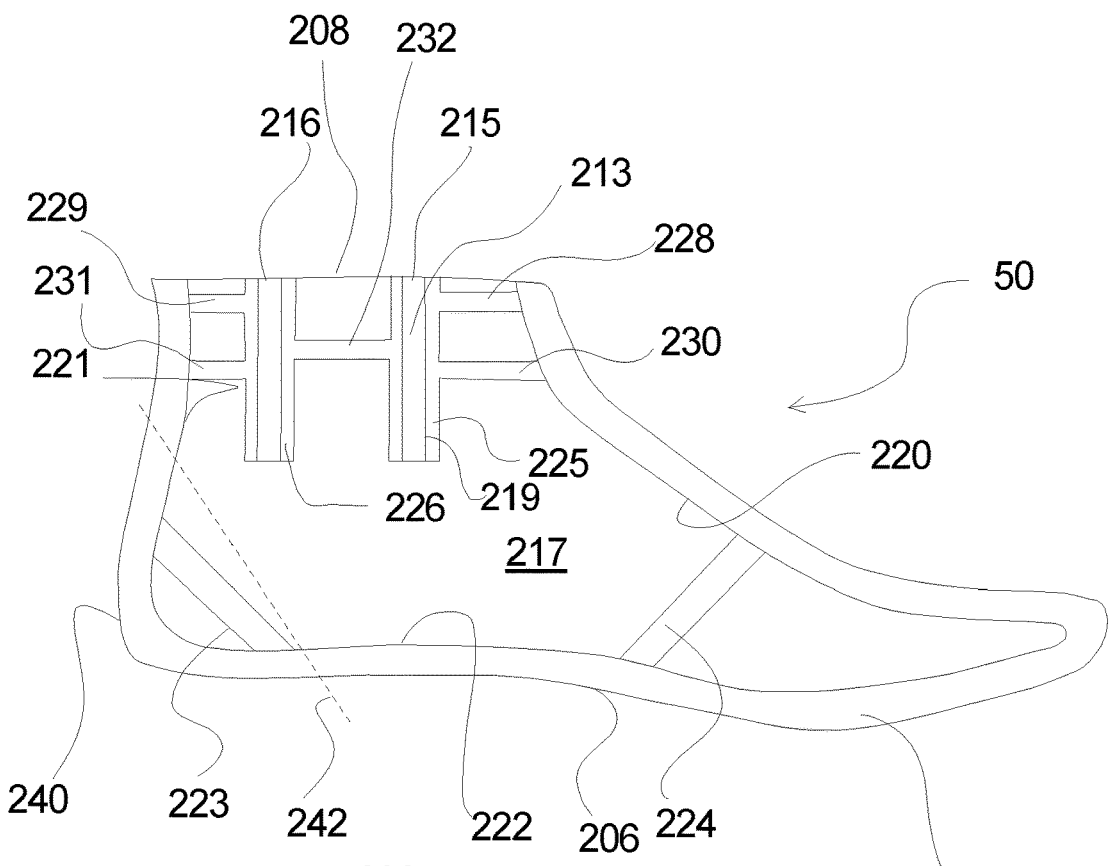
Figure 15C:
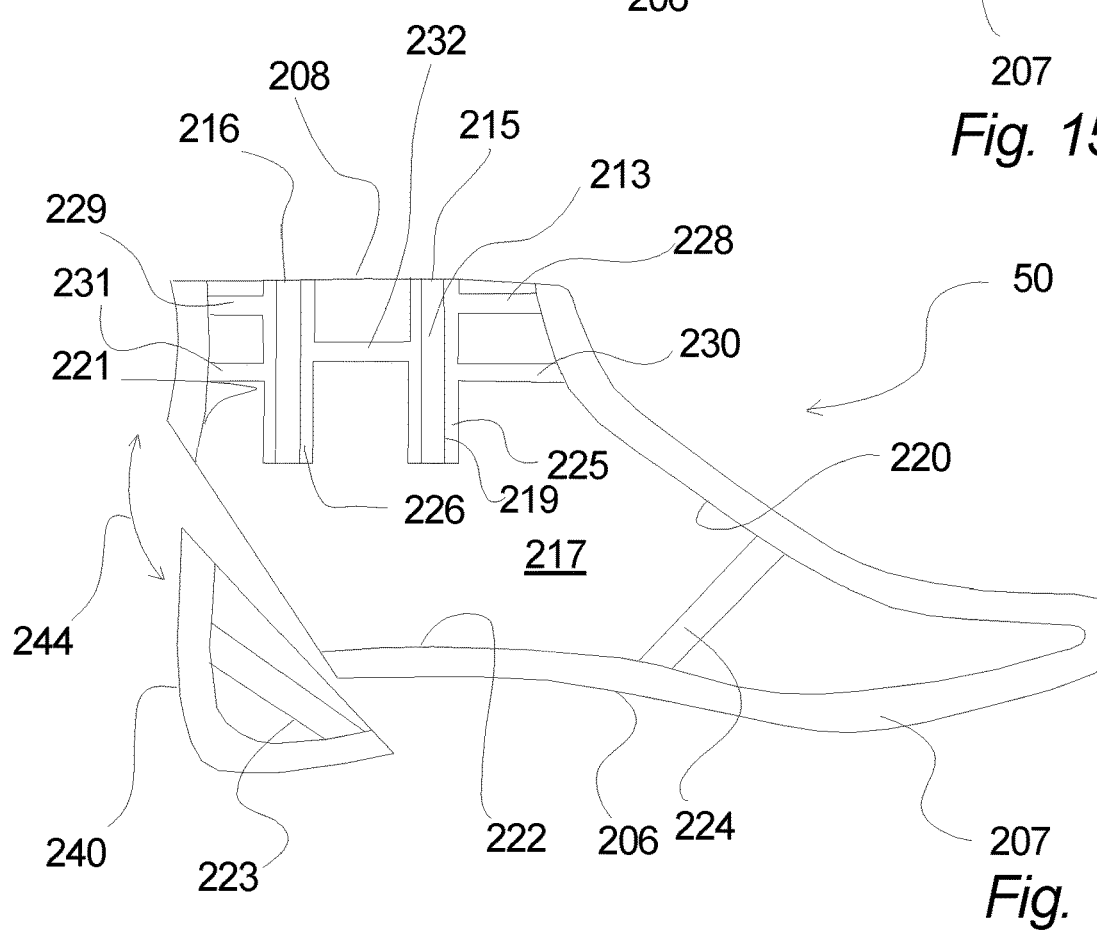
Figure 16:
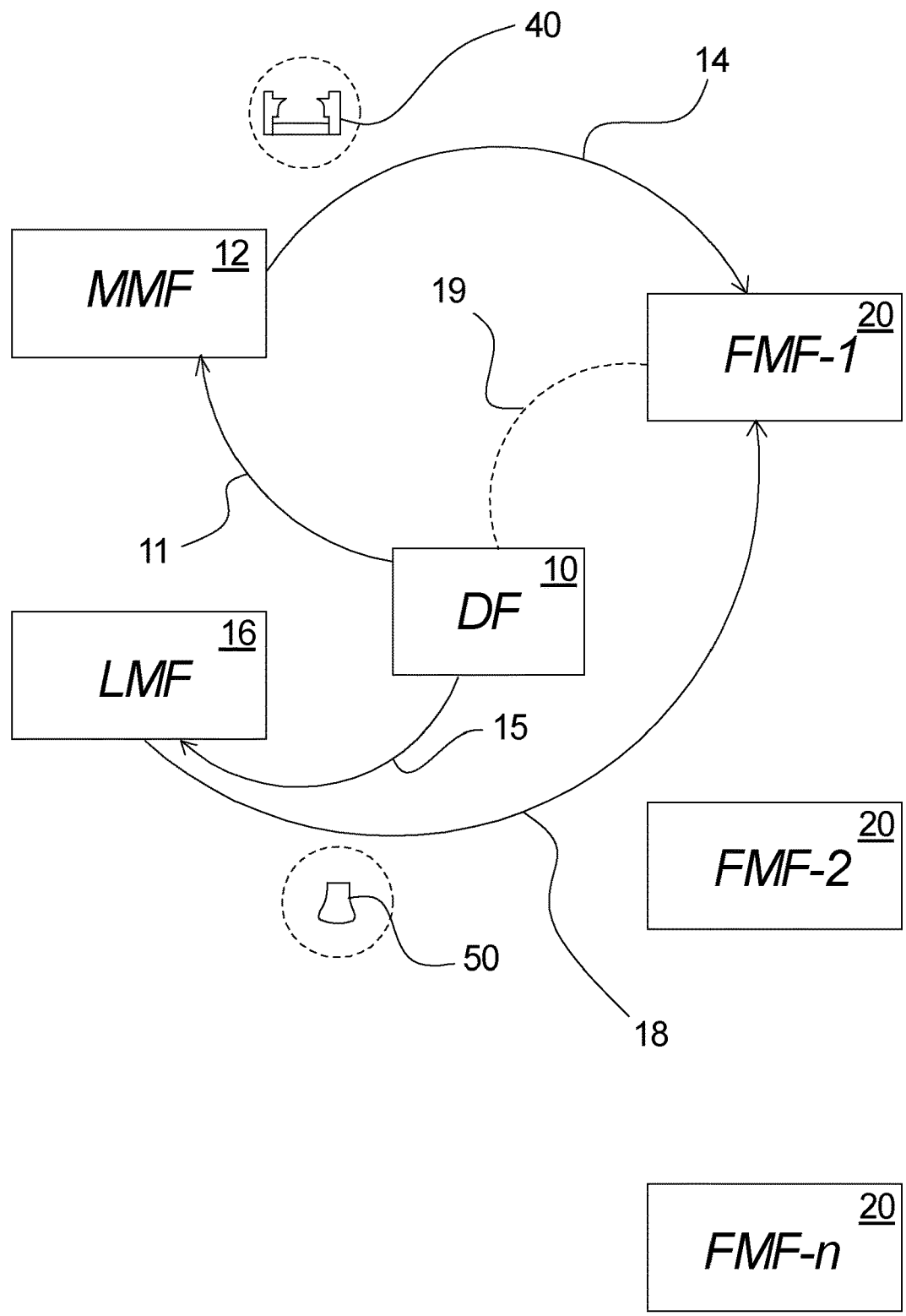
Figure 17:
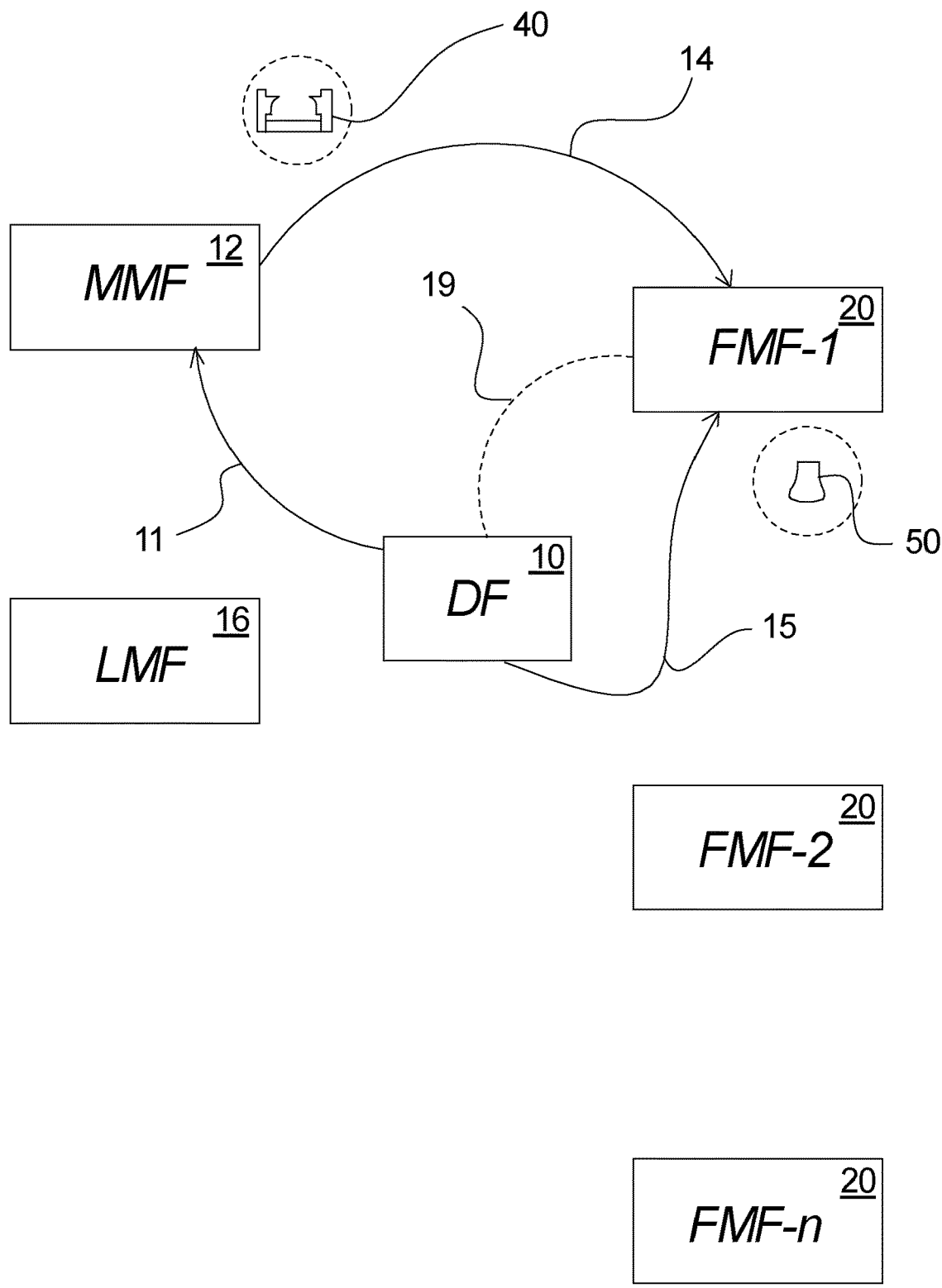
Figure 18A:
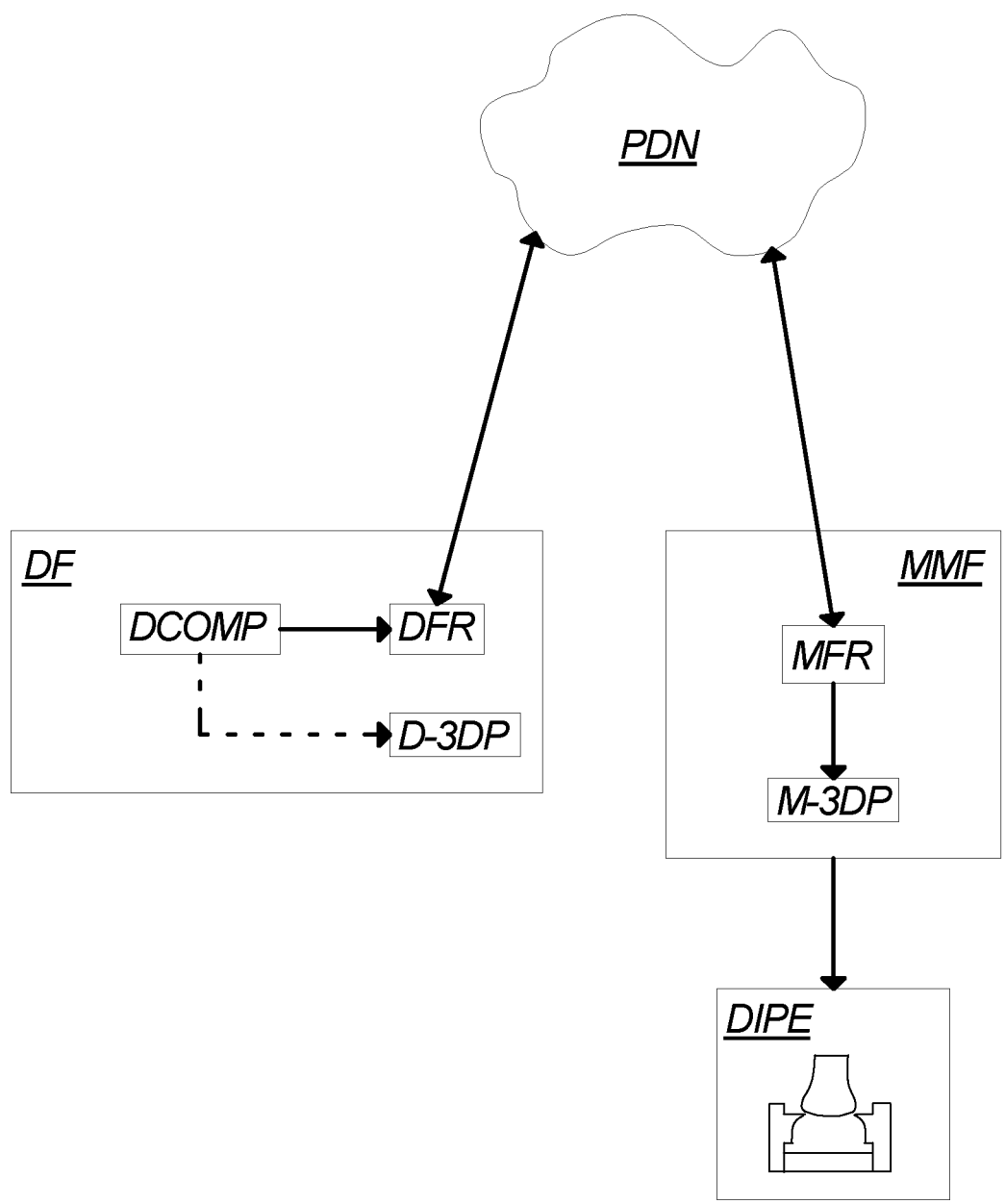
Figure 18B:
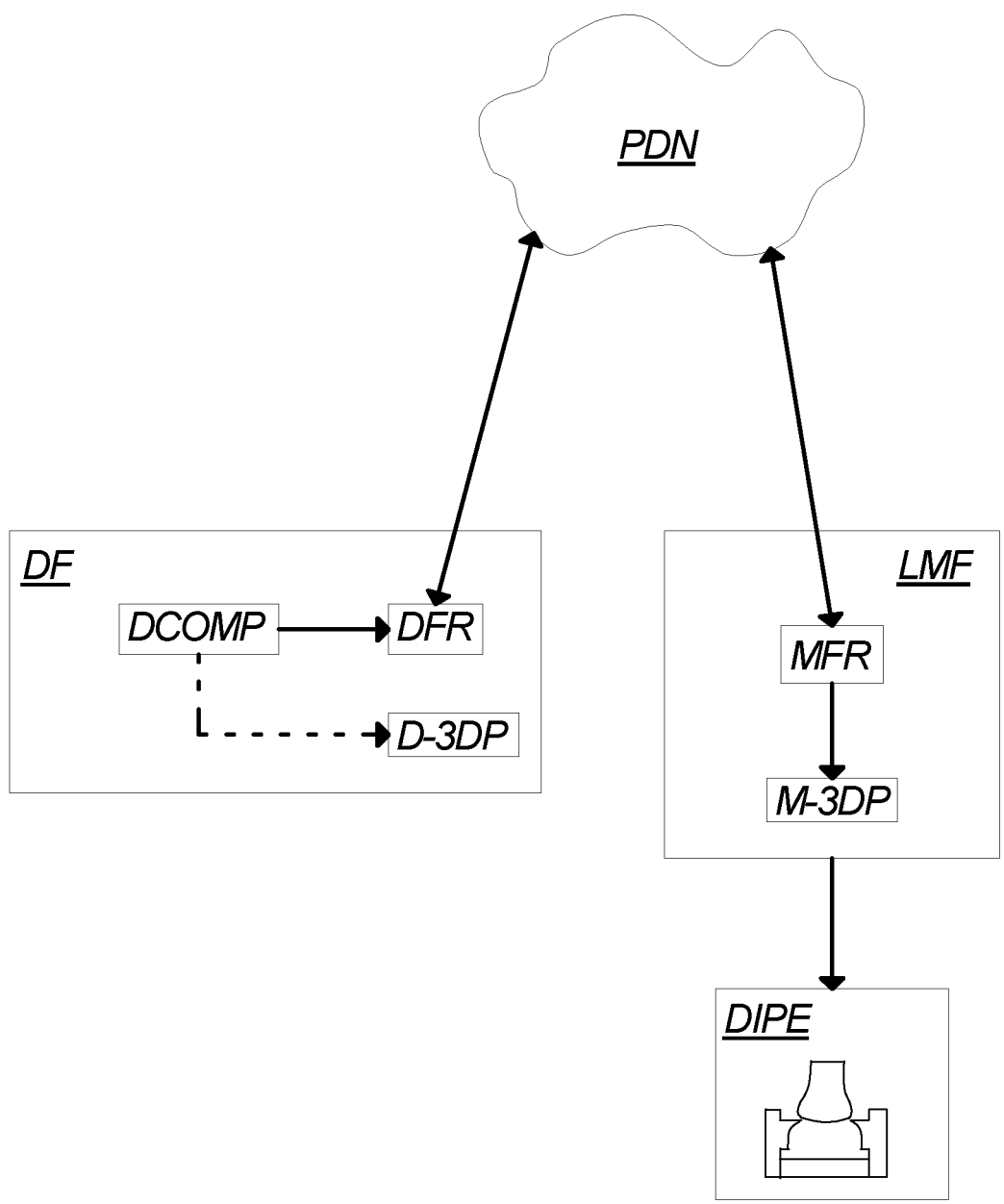
Figure 18C:
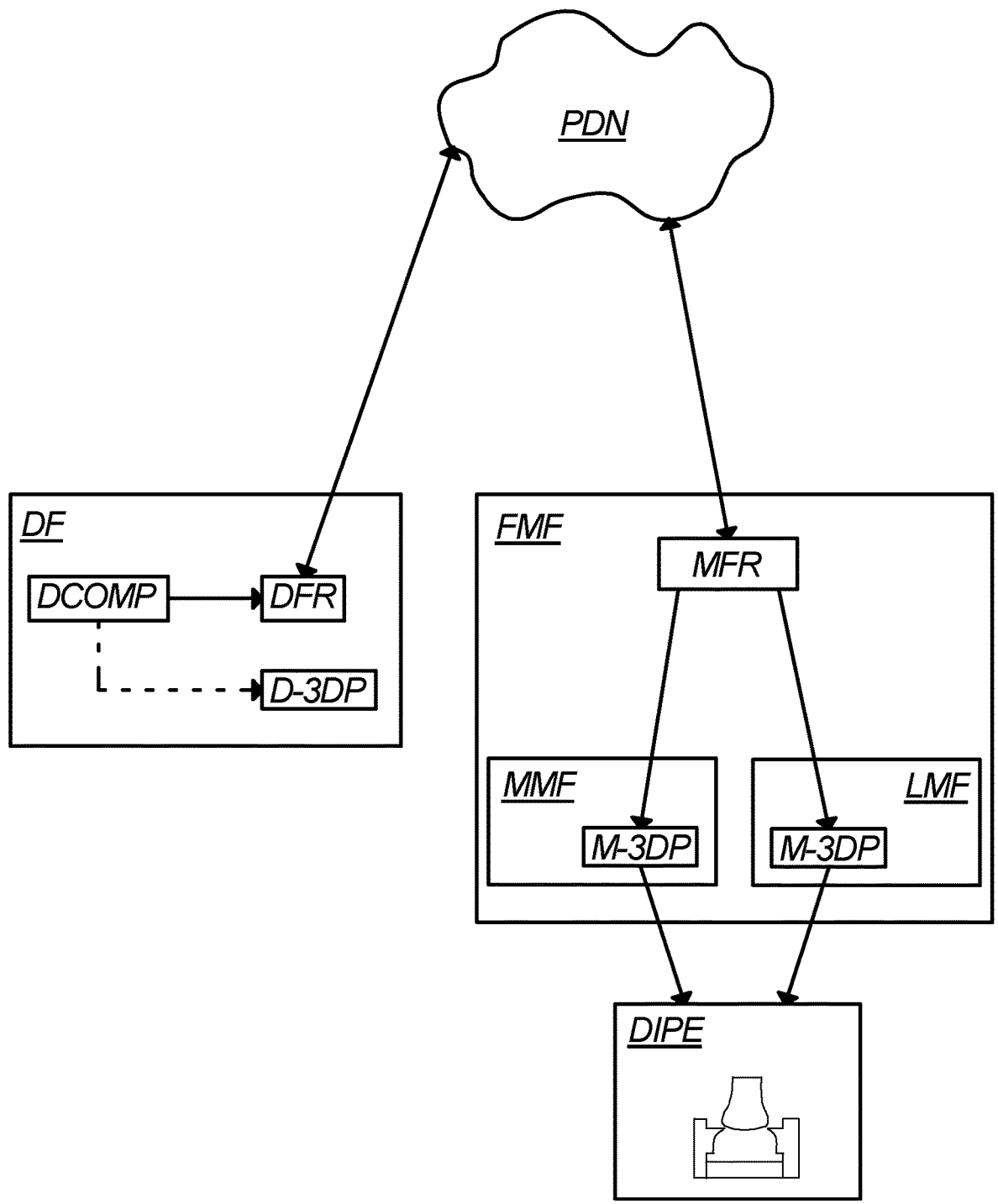
Figure 19A:
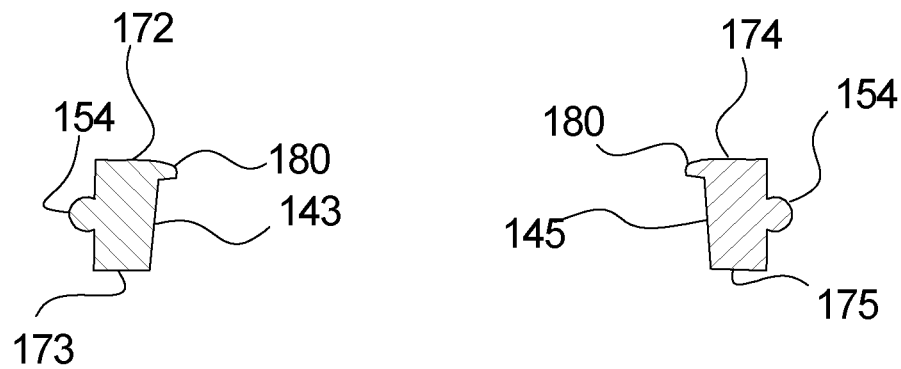
Figure 19B:
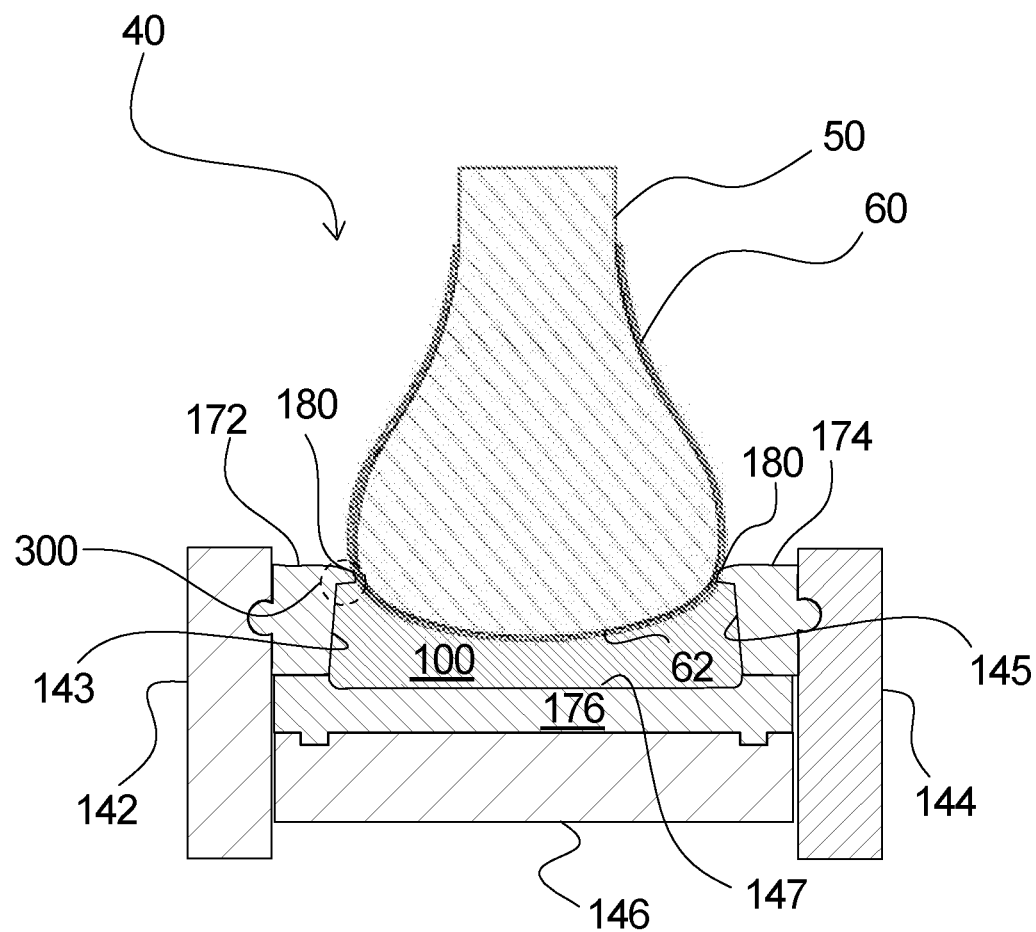
Figure 19C:
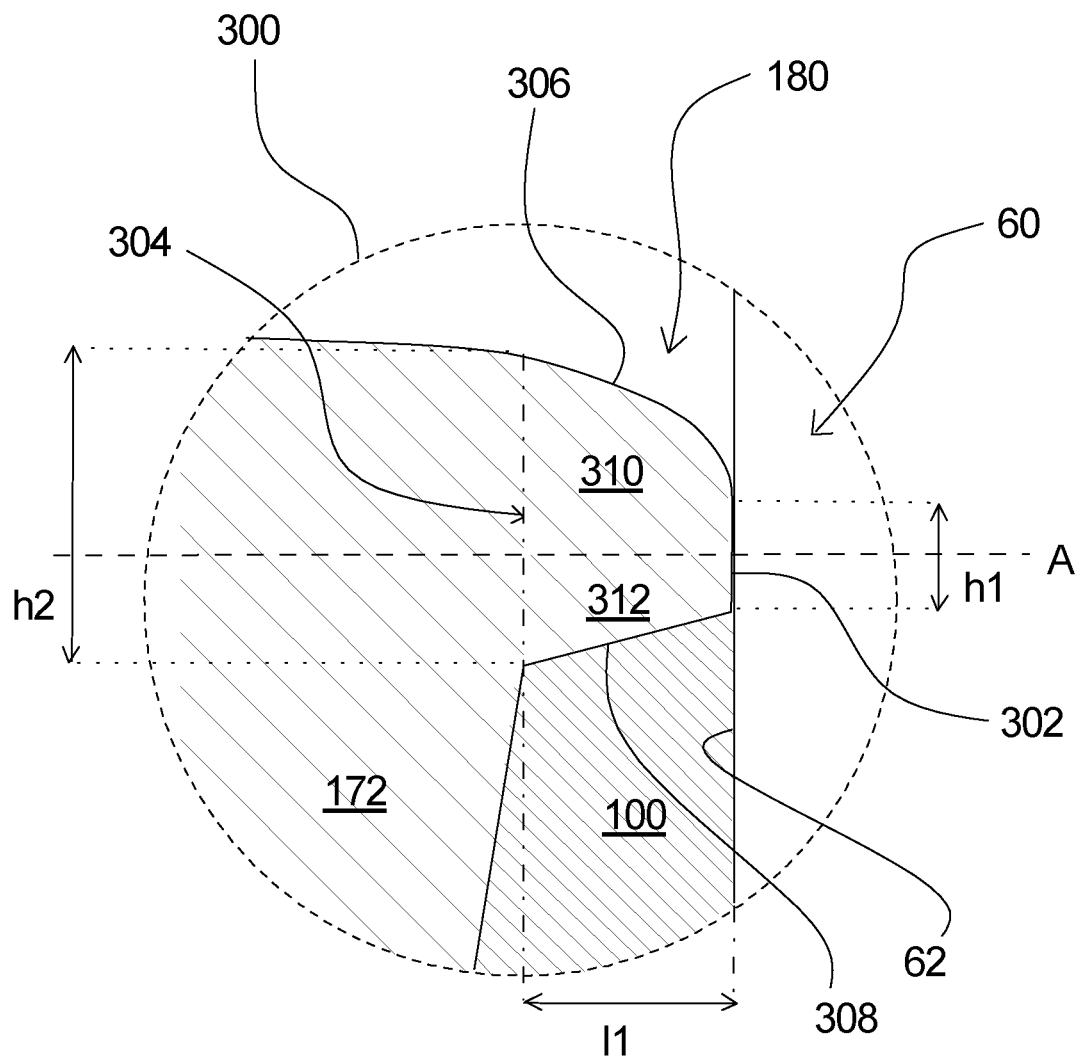

The invention will be explained in further detail below with reference to the figures of which FIG. 1 illustrates a system for production of footwear, including manufacturing of tooling, in accordance with a prior art, FIG. 2 shows a schematically illustrated last and mould, seen in a cross-sectional view, as used for direct injection moulding of footwear according to a prior art, FIG. 3 shows a schematically illustrated basic direct injection mould, seen in a cross-sectional view, that may be used in connection with direct injection moulding of footwear according to the present disclosure, FIG. 4 shows a cross-sectional schematic diagram of a footwear injection mould in accordance with the present disclosure, FIGS. 5-8 show sectional schematic diagrams of a footwear injection mould from its open position to a closed position, FIG. 9 illustrates a system for production of footwear, including manufacturing of tooling, according to the present disclosure, FIG. 10 shows a schematically illustrated mould, seen from above, FIG. 11 illustrates the mould that is shown in FIG. 10, but in an open state, and FIG. 12 shows the schematically illustrated mould as shown in FIG. 11, but with the side inserts removed from their inserted positions, FIG. 13 shows an exemplary last body having a last holder, FIG. 14 shows a side perspective view of an exemplary last for footwear production, FIGS. 15a-c show a side sectional view of exemplary last embodiments for footwear production, FIG. 16-17 illustrate further aspects of a system and a method for production of footwear, including manufacturing of tooling, according to the present disclosure, FIG. 18a-c illustrate different configurations of the system within the scope of the invention, FIG. 19a illustrate a further embodiment of the direct injection mould inserts, FIG. 19b shows an embodiment of a cross-sectional view of a footwear injection moulding system, and FIG. 19c is an enlarged view of a cut-out of FIG. 19b relating to the lip area of the direct injection mould inserts.

DETAILED DESCRIPTION

In FIG. 1 a system for production of footwear is illustrated, wherein the illustrated system includes manufacturing of tooling for production of footwear as it takes place in connection with a prior art system.

A design facility (DF) 10, which is located at a design facility location, provides a footwear design, e.g. when a new type, a new design, etc. of a shoe is to be made. In connection with a direct injection production (DIP) process, wherein a shoe upper is placed on a last, wherein the last with the shoe upper is placed into a mould and wherein subsequently a liquid sole material such as for example liquid polyurethane (PU) is injected into the mould to effect a strong attachment of the upper to the sole, a last and a mould must be provided, corresponding to the specific footwear design.

The manufacture of moulds and lasts are typically specialized jobs and are typically made by specialized entities, e.g. due to the required knowledge and skills, and thus, the manufacture of moulds is made at a mould manufacturing facility (MMF) 12, which receives the necessary data regarding the specific footwear design from the design facility (DF) 10 as illustrated by the arrow 11 in FIG. 1.

The mould manufacturing facility (MMF) 12 conventionally manufactures the moulds by CNC (Computerized Numerically Controlled) machines, e.g. by milling the surfaces out of a block of metal, e.g. aluminium. Based on the received data, the mould manufacturing facility (MMF) 12 thus makes a mould 40, a section of which is schematically illustrated in FIG. 1 in a dash circle, and the mould is transported as illustrated at 14 to a footwear manufacturing facility (FMF-1) 20 located at a footwear manufacturing location, possibly via the design facility (DF) 10.

It is noted that the system may comprise a plurality of footwear manufacturing facilities 20, e.g. FMF-1 to FMF-n, and that each of these may be located at different footwear manufacturing locations.

In an analogous manner, the manufacture of lasts is made at a last manufacturing facility (LMF) 16, which receives the necessary data regarding the specific footwear design from the design facility (DF) 10 as illustrated by the arrow 15 in FIG. 1.

The last manufacturing facility (LMF) 16 conventionally manufactures the lasts by CNC machines, e.g. by milling the surfaces out of a block of metal or plastic. Based on the received data, the last manufacturing facility (LMF) 16 thus makes a last 50, a section of which is schematically illustrated in FIG. 1 in a dash circle, and the last is transported as illustrated at 18 to a footwear manufacturing facility (FMF-1) 20 located at a footwear manufacturing location, possibly via the design facility (DF) 10.

At the footwear manufacturing facility (FMF-1) 20 the received mould 40 and last 50 are tested, e.g. by making samples of footwear, and any flaws, e.g. lack of compatibility between mould and last, lack of agreement between samples and the specified footwear design, etc. may be registered and reported to e.g. the design facility (DF) 10 as feedback 19, to the mould manufacturing facility (MMF) 12 and/or to the last manufacturing facility (LMF) 16. Furthermore, the e.g. mould 40 and/or last 50 may be returned to the respective manufacturing facilities for correction, whereafter the mould 40 and/or last 50 may again be transported to the footwear manufacturing facility (FMF-1) 20 for e.g. testing, etc.

Thus, it will be understood that such a prior art production system may require a relatively long running-in period, e.g. due to the respective locations being located away from each other and due to the time-consuming transports of the respective tools, e.g. moulds and lasts, possibly enlarged by any necessary corrections to the tools. Furthermore, the costs involved in a start-up of a new footwear design may thus be relatively large. This is even more the case, when it is kept in mind that when a new design or type of footwear is introduced, this usually requires tooling, e.g. moulds and lasts, for left hand and right hand footwear and furthermore, moulds and lasts for a plurality of different footwear sizes.

With reference to FIG. 2 the prior art will be further elucidated. This figure shows schematically a last 50 and a mould 40, both seen in a cross-sectional view, which last 50 and mould 40 may be utilized for direct injection moulding of footwear according to the prior art. The mould 40 may as mentioned above have been made out of metal, for example aluminium by e.g. CNC machinery and may as shown in FIG. 2 comprise a first side mould 42, a second side mould 44 and a bottom mould 46, which are arranged in such a manner that the mould 40 may be opened and closed, e.g. by the first side mould 42 and the second side mould 44 being able to be moved in horizontal directions as indicated with the arrows A, B and by the bottom mould 46 being arranged to be moved in the vertical direction as indicated with the arrow C. As shown in FIG. 2, the first side mould 42 and the second side mould 44 may be provided with a first side surface 43 and a second side surface 45, respectively, that have been made during the e.g. CNC milling, and which generally define a desired form of a side part of a shoe sole to be moulded. Further, the bottom mould 46 may correspondingly be provided with a bottom inner surface 47, which have been made during the e.g. CNC milling and which generally has a form corresponding to a desired form of the underside of the shoe sole to be moulded.

Further, it is shown in FIG. 2 that a footwear upper 60 may be put onto the last 50 and that the last 50 with the footwear upper 60 can be moved in various directions including downwards in relation to the mould 40 as indicated with the arrow D. It will be understood that when performing such a step, it is required that the mould 40 is in an open state in order to allow the last 50 to move into the mould 40. Hereafter the mould 40 may be closed, thus forming a mould cavity 80 between the footwear upper 60, the first side mould 42, the second side mould 44 and the bottom mould 46. The mould 40 is attached to injection moulding equipment (not shown in the figures), by means of which injection material is injected into the mould cavity, where it comes into contact with the first side surface 43, the second side surface 45, the bottom inner surface 47 and the bottom parts of the footwear upper 60. When the injected material has taken the shape of the mould cavity, it is cured.

Further details of the mould and the moulding process will be understood from the following, wherein a mould and the moulding process will be elucidated in connection with the FIGS. 3-8 that illustrate direct injection equipment and a direction injection process as utilized in connection with the present disclosure.

FIG. 3 shows a schematically illustrated basic direct injection mould 140, seen in a cross-sectional view, that may be used in connection with direct injection moulding of footwear according to the present disclosure. The basic direct injection mould 140 may comprise a first basic side mould 142, a second basic side mould 144 and a basic bottom mould 146. It is noted that more than these three basic parts may be used for forming a basic direct injection mould 140, e.g. two or more basic side moulds at one or both sides, etc.

Generally, it is noted that the basic parts are movable in relation to each other, e.g. by the first basic side mould 142 and the second basic side mould 144 being able to move in e.g. horizontal directions as indicated by the arrows and by the basic bottom mould 146 being able to move in the e.g. vertical direction as indicated by the arrow, whereby the basic direct injection mould 140 can be arranged to open and close around a last.

Furthermore, it is noted that the basic parts are arranged to be coupled with insert parts (not shown here), e.g. by means of basic side coupling elements 152 comprised by the first basic side mould 142 and the second basic side mould 144, for example on or in e.g. the inner surfaces of these. Correspondingly, the basic bottom mould 146 comprises basic bottom coupling elements 156, for example on or in e.g. the inner surface of the basic bottom mould 146.

Even further, it is noted that the basic direct injection mould 140 may be configured to be attached to injection moulding equipment (not shown).

FIG. 4 shows a cross-sectional view of a footwear injection mould 40 in accordance with the present disclosure, where the cross sectional plane may be a vertical plane that may be seen as being perpendicular to the longitudinal axis of the footwear injection mould. The footwear injection mould comprises a basic direct injection mould 140 as described above and insert parts, examples of which will be described in the following.

Thus, the footwear injection mould 40 comprises a basic direct injection mould 140 having a first basic side mould 142, a second basic side mould 144 and a basic bottom mould 146. The footwear injection mould 40 in FIG. 4 is in an open state, where the first basic side mould 142, the second basic side mould 144 and the basic bottom mould 146 are spaced from each other, allowing access to the inner space from one or more positions, e.g. in order to allow insert parts to be mounted. The first basic side mould 142, the second basic side mould 144 and the basic bottom mould 146 are provided with attachment parts (not shown) that allow the basic direct injection moulds 142, 144, 146 to be attached to an injection moulding equipment (not shown), and where the attachment to the injection moulding equipment may be adapted to transfer heat from the injection moulding equipment to the basic direct injection moulds 142, 144, 146 so that the footwear injection mould can be warmed up to a predefined temperature to optimize the injection moulding of the footwear part in the mould cavity 80 (e. g. FIG. 7).

The first basic side mould 142, the second basic side mould 144 and the basic bottom mould 146 may be provided with a first side insert 172, a second side insert 174 and a bottom insert 176, respectively, where the first side insert 172, the second side insert 174 and the bottom insert 176 may be coupled to the first basic side mould 142, the second basic side mould 144 and the basic bottom mould 146, respectively. The first basic side mould 142 and the second basic side mould 144 may be provided with basic side coupling elements 152 that are adapted to mate with insert side coupling elements 154 that allow the first side insert 172 and the second side insert 174 to be coupled to the first basic side mould 142 and the second basic side mould 144, respectively. The coupling elements 152, 154 may be adapted to hold the first side insert 172 and the second side insert 174 relative to the first basic side mould 142 and the second basic side mould 144, respectively, during the injection moulding process. In an analogous manner, the basic bottom mould 146 may be provided with basic bottom coupling elements 156 that that are adapted to mate with bottom insert coupling elements 158 that allow the bottom insert 176 to be coupled to the basic bottom mould 146. The coupling elements 156, 158 may be adapted to hold the bottom insert 176 relative to the basic bottom mould 146 during the injection moulding process. Thus, it may be ensured that the first side insert 172, the second side insert 174 and the bottom insert 176 are held in position while the footwear injection mould 40 is moved from its open position, as shown in FIG. 5 towards its closed position, shown in FIG. 7 and during the injection moulding process, as shown in FIG. 8.

As further illustrated in FIG. 4, the first side insert 172, the second side insert 174 and the bottom insert 176 may be coupled to the first basic side mould 142, the second basic side mould 144 and the basic bottom mould 146, respectively, when the basic direct injection mould 140 is in an open state, e.g. by engaging the respective coupling elements 152, 154, 156, 158 as indicated with the dash lined arrows in FIG. 4. These coupling elements may be designed in various manners, e.g. as snap-locking means, self-locking means, press couplings, mating couplings, etc. It is noted that for the sake of clarity, the first basic side mould 142, the second basic side mould 144 and the basic bottom mould 146 are shown in FIG. 4 in positions removed from each other, whereby furthermore the coupling with the insert parts, e.g. 172, 174 and 176 may be clearly observed.

Figure 5:
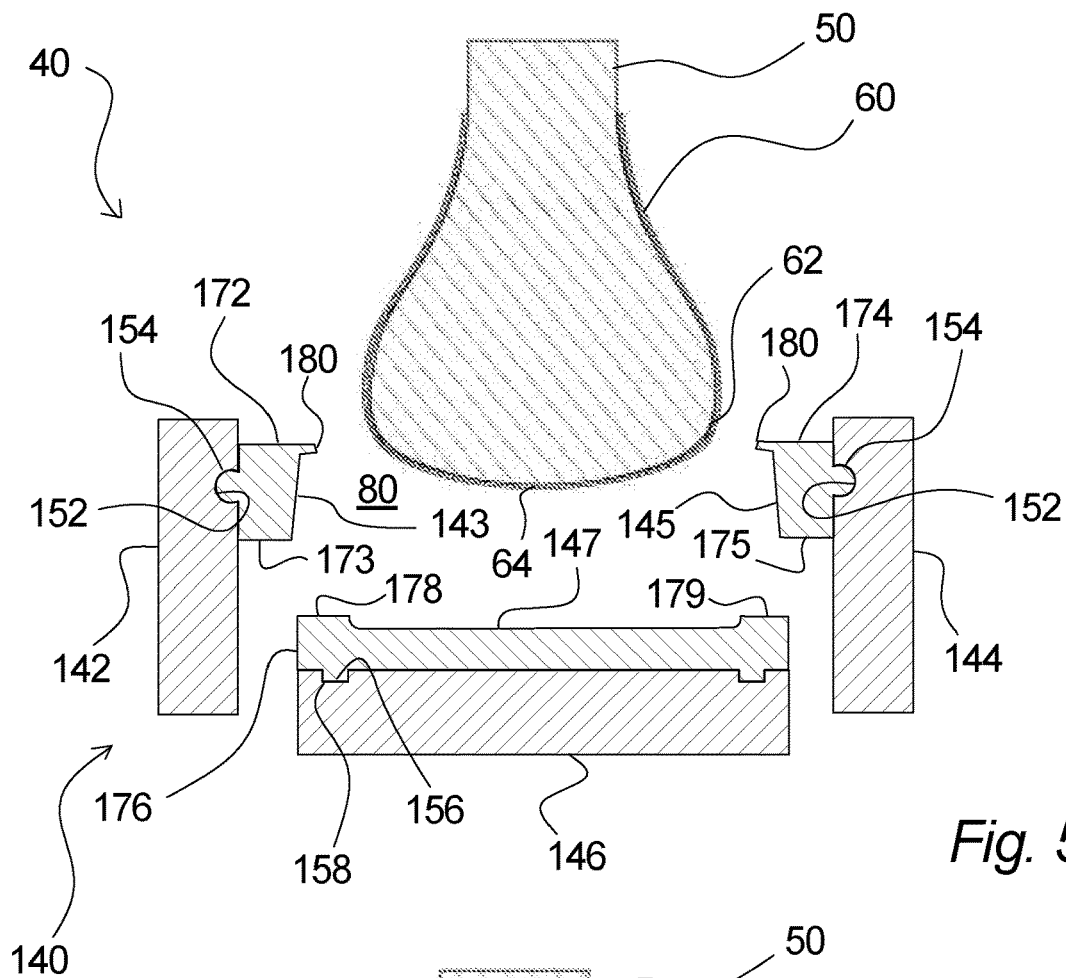

FIG. 5 shows a cross-sectional view of a footwear injection mould 40 corresponding to FIG. 4, wherein the first side insert 172, the second side insert 174 and the bottom insert 176 have been coupled to the first basic side mould 142, the second basic side mould 144 and the basic bottom mould 146, respectively. Further, the footwear injection mould 40 has been arranged in an open state with a last 50, which carries a footwear upper 60, placed in a position near the opening of the footwear injection mould 40.

The first side insert 172, the second side insert 174 and the bottom insert 176 may be adapted to provide a mould cavity 80, by providing a first side insert surface 143, a second side insert surface 145 and a bottom insert surface 147 providing an outer surface of the element to be moulded inside the mould cavity 80. The upper part of the mould cavity 80 may be delimited by the footwear upper 60, which may be mounted on a last 50, where the last fixes the upper 60 relative to the mould cavity 80. Furthermore, the first side insert 172 and the second side insert 174 are provided with a lip 180, where the lip has a form and shape that is adapted to follow an outer surface 62 of the upper 60. When the lip 180 is pushed into contact with the outer surface 62 of the upper 60, as e.g. seen in FIG. 6 the lip may close off the mould cavity in conjunction with the bottom part 64 of the upper 60, and assist in preventing that injection moulding material which is introduced into the mould cavity 80 can exit the mould cavity 80 via the upper opening of the cavity 80.

The first side insert 172 and the second side insert 174 may be provided with a first 173 and a second contact surface 175 positioned on a bottom part of the first side insert 172 and the second side insert 174, respectively, which may be adapted to abut a first 178 and a second 179 upper contact surface of the bottom insert surface 176. The contact surfaces may be adapted to close off the mould cavity 80 between the first side insert 172, the second side insert 174 and the bottom insert 176. The contact surface may extend from a front end (toe end) of the first side insert 172, the second side insert 174 and the bottom insert towards its back end (heel end).

Furthermore, the first side insert 172 and the second side insert 174 may have third and/or a fourth contact surface (not shown) between the moulds, where the contact surfaces may be positioned in an area where the first side insert 172 and the second side insert 174 divide the sides of the mould cavity between them. FIG. 5 shows that the last 50 has been introduced into the moulding cavity, allowing the bottom part of the footwear upper 60 to be exposed to the upper part of the mould cavity 80. The last 50 may be moveable in a vertical direction in and out of the mould cavity 80, so that when the footwear part has been moulded to the upper, the last 50, the upper 60 and the footwear part may be maneuvered away from the mould cavity for removal, and the next last and upper may be introduced into the mould cavity.

Figure 6:
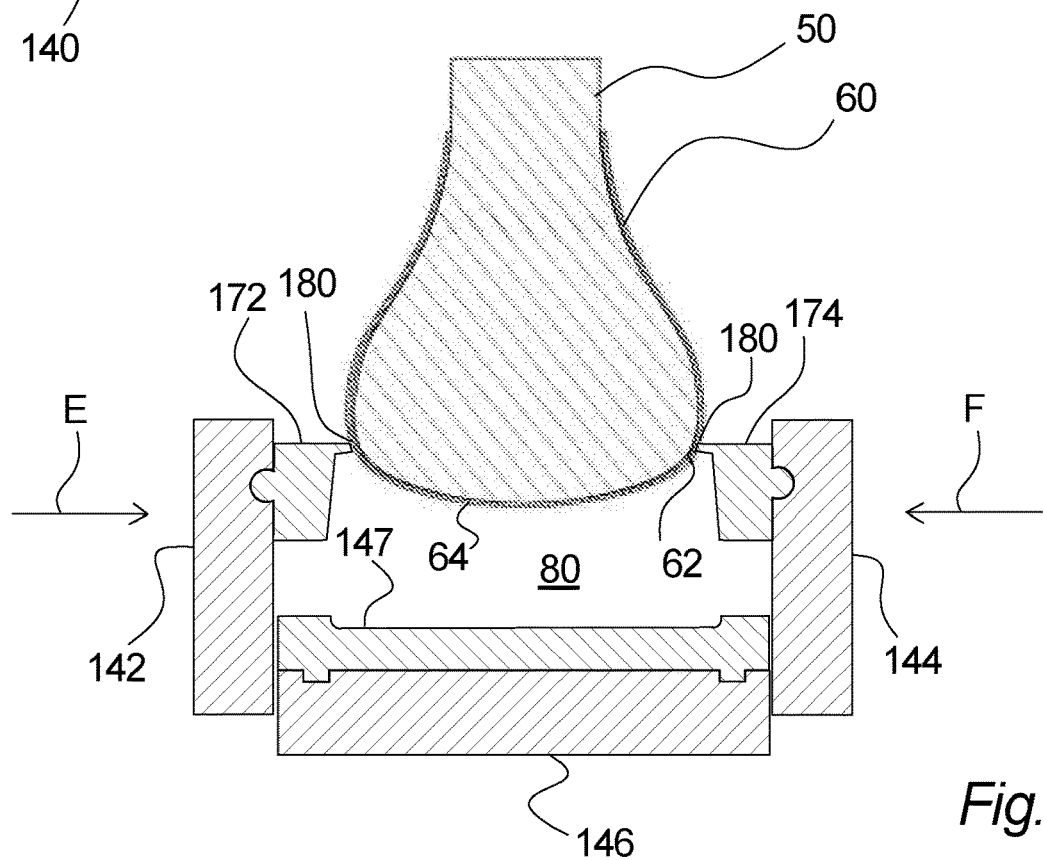

FIG. 6 shows an intermediate state of the footwear injection mould, where the first basic side mould 142, the second basic side mould 144, the first side insert 172 and the second side insert 174 have been maneuvered inwards in the directions E, F towards the upper 60, where the lip 180 is moved into contact with the upper 60, and the first side insert 172 and the second side insert 174 come into contact with each other at their toe and heel end (not shown) to close off the upper part of the mould cavity 80. The lip 180 and the contact surfaces are forced into contact so that the flow of the injection material cannot pass out of the mould cavity via the contact surfaces and the lip 180.

Prior to this movement, the injection material 90, may be introduced into the mould cavity, e.g. by introducing it to the upper surface 147 of the bottom insert 176 prior to the closing of the footwear injection mould 40, where the mould 40 may be closed allowing the injected material to expand to fill the mould cavity 80 and to bond to the lower part 64 of the upper 60.

FIG. 7 shows where the basic bottom mould 46 and the bottom insert 176 have been moved upwards in a vertical direction G, where the bottom insert 176 abuts the first side insert 172 and the second side insert 174, thus closing the mould cavity 80. When the footwear injection mould 40 is closed, the mould cavity 80 is closed to the surrounding environment, ensuring that the injected material 90 takes the shape of the mould cavity 80.

FIG. 8 shows where the injected material 90 has expanded to fill out the entire volume of the mould cavity 80, where the injected material 90 comes into contact with the inner surfaces of the first side insert 172, the second side insert 174 and the bottom insert 176, causing the outer surface of the injected material 90 to take the shape of the mould cavity and the inner surfaces of the first side insert 172, the second side insert 174 and the bottom insert 176, to form a footwear sole 100.

When the injected material 90 has cured, the first 142 and second basic side mould 144 together with the first side insert 172 and the second side insert 174, respectively, may be moved in a horizontal movement opposite to the direction E, F shown in FIG. 6, and the basic bottom mould 146 together with the bottom insert 176 may be moved in the opposite direction to the direction G shown in FIG. 7, thereby opening the footwear injection mould. The movement of the first basic side mould 142, the second basic side mould 144 and the basic bottom mould 146 allows the first side insert 172, the second side insert 174 and the bottom insert 176 to be removed from the injected material 90 and the last 50, the upper 60 and the sole 100 may be removed from the mould 40.

If the injection moulding equipment is supposed to be utilized for a different type of shoe or a different size of shoe, the first side insert 172, the second side insert 174 and the bottom insert 176 may be de-coupled from the basic direct injection mould 140, e.g. from the first 142 and second basic side mould 144 and from the basic bottom mould 146, and replaced with another set of first side insert 172, second side insert 174 and bottom insert 17, that define an alternative mould cavity, as well as exchanging the last and the upper to close off the upper part of the mould cavity, where the additional set of first side insert, second side insert and bottom insert may be coupled to the basic direct injection mould 140, e.g. to the first 142 and second basic side mould 144 and to the basic bottom mould 146, respectively. Thus, the basic direct injection mould 140 may be utilized for a plurality (more than one) of inserts, e.g. a first side insert, a second side insert and a bottom insert, and the injection moulding equipment may be quickly made ready for the injection of a different type of article of footwear.

The inserts may be manufactured locally, e.g. by the footwear manufacturing facility (FMF-1-*n*) 20, which has been selected to manufacture the actual footwear, based on data that has been provided by the design facility (DF) 10. The manufacture of the inserts may be made in various manners and using various materials that can be handled locally e.g. at the footwear manufacturing facility (FMF-1-*n*) 20, without the use of costly machinery such as CNC machinery, metal casting equipment, etc, for example, the inserts may be made by means of additive manufacturing, e.g. using 3D printing or any other additive manufacturing processes known within the field. Hereby, the time and cost required in transporting moulds, which has been manufactured with mould inner surfaces integrated with the mould can be avoided. Furthermore, it is noted that the inserts alternatively may be made at e.g. the mould manufacturing facility (MMF) 12, also utilizing additive manufacturing, e.g. using 3D printing or any other additive manufacturing processes, whereby the advantage is achieved of having to transport only the relatively light and small inserts as opposed to the prior art systems, where the relatively heavy and voluminous moulds made from e.g. aluminium and with integrated mould inner surfaces have to be transported to the footwear manufacturing facility (FMF-1-*n*) 20 in a relatively large number, e.g. two for each shoe size, namely left and right.

FIG. 9 illustrates a system for production of footwear, including manufacturing of tooling, according to the present disclosure, which system corresponds to FIG. 1 and includes a design facility (DF) 10, a mould manufacturing facility (MMF) 12, a last manufacturing facility (LMF) 16 and a plurality of footwear manufacturing facilities (FMF-1-*n*) 20.

At the mould manufacturing facility (MMF) 12 a mould is made, based on the design communicated from the design facility 10 and more specifically, a basic direct injection mould 140 is being manufactured, e.g. by CNC machines, casting etc., out of metal, e.g. aluminium and corresponding inserts are being designed and descriptive data are made in order to manufacture such inserts. The basic direct injection mould 140, a section of which is schematically illustrated in FIG. 9 in a dash circle, is transported as illustrated at 14 to the selected footwear manufacturing facility (FMF-1) 20 located at a footwear manufacturing location, possibly via the design facility (DF) 10, and the mould descriptive data relating to the inserts are communicated to the selected footwear manufacturing facility (FMF-1) 20. The selected footwear manufacturing facility (FMF-1) 20 may thus manufacture the inserts locally, e.g. by additive manufacturing such as 3D printing, etc.

If initial tests show that corrections need to be made to the mould, such information may be communicated to the mould manufacturing facility (MMF) 12 and/or the design facility 10, from where corrected mould descriptive data may be returned to the selected footwear manufacturing facility (FMF-1) 20 for manufacture of new inserts. Thus, transport back and forth of relatively heavy and voluminous moulds can be avoided.

The same applies as regards the scenario where a new design, other shoe sizes etc. have to be manufactured, where possibly the same basic direct injection mould 140 may be utilized at the footwear manufacturing facility (FMF-1-*n*) and new mould descriptive data are being delivered to the footwear manufacturing facility (FMF-1-*n*) for manufacturing of corresponding inserts.

FIGS. 10 to 12 show an example of a schematically illustrated mould 40, seen from above, and where for the sake of clarity the bottom parts, e.g. bottom mould and bottom inner surface, are not shown. However, as it will be apparent from e.g. FIGS. 4-8 and the corresponding disclosure, such parts will be present as well in the actual mould. Thus, in FIG. 10 a mould 40 is shown in a closed state, where the mould 40 comprises a schematically illustrated basic direct injection mould 140 having a first 142 and a second basic side mould 144 with equally schematically illustrated first 172 and second side insert 174. For the sake of simplicity, these two side inserts 172, 174 each cover one half of the mould surface but as previously mentioned, each side insert 172, 174 may comprise two or more side inserts. As illustrated, these side inserts 172, 174 together form the mould surface in the side direction, e.g. with a lip 180 that—with a hypothetical shoe design—will meet with a shoe upper mounted on a last as it has been described above.

In FIG. 11 it is illustrated in a corresponding manner that the basic direct injection mould 140 with the mounted inserts 172, 174 has been operated to be in an open state.

FIG. 12 illustrates schematically that the first 172 and the second side insert 174 have furthermore been removed from their inserted positions in the basic direct injection mould 140. Here, it is shown that the basic side coupling element 152 that is formed in or on the first 142 and the second basic side mould 144 may be configured as protruding parts 152' or depressions 152". Correspondingly, it is shown that the insert side coupling element 154 that is formed in or on the first 172 and the second side insert 174 may be configured as protruding parts 154' or depressions 154". As shown in FIG. 12 and as it will be understood, a protruding part 152' in a basic side mould 142, 144 will match with a depression 154" in an insert 172, 174 and similarly, a depression 152" in a basic side mould 142, 144 will match with a protruding part 154' in an insert 172, 174.

Thus, the inserts may be matched to a particular basic direct injection mould, since the combinations of different coupling means, e.g. depressions and protruding parts, may ensure that insertion of a "wrong" set of inserts in a basic direct injection mould is prohibited. The coupling elements may be varied in numerous other manners than illustrated in FIG. 12, e.g. by having different lengths, widths, depths, linear/non-linear configurations, etc., which further enlarges the number of possible combinations Furthermore, by having depressions as well as protrusions it may be prevented that any easy modification can be made of e.g. insert coupling elements or basic direct injection mould coupling elements to allow an unintended or un-authorized coupling to be made e.g. at a footwear manufacturing facility.

The configuration of the various coupling elements may be footwear design specific, customer specific and/or footwear manufacturing facility specific.

FIGS. 13 and 14 show an example of a last for footwear production, where the last 50 has a toe end 201, a heel end 202, a medial end 203 and a lateral end 204, and also an upper surface 205 and a lower surface 206. The last has a side wall 207, where the side wall has an outer surface 214 and an inner surface (not shown), where the inner surface defines an inner volume (not shown) of last 50.

The last 50 comprises a connecting part 208, where the connecting part 208 is a connecting surface 209, which is positioned in an ankle area of the last, where the connection surface 209 is arranged in a region of the last 50, which is defined to be around a foot insertion opening of an article of footwear. The connecting surface 209 may be seen as closing off the inner volume of the last, where the side wall 207 and the connecting surface 209 define the inner volume of the last 50. The connecting part 208 or the connecting surface 209 of the last may comprise a groove 210. The groove may e.g. be configured to receive a mating protrusion 211 of a last holder 212 (shown in FIG. 14, which may be utilized to increase the stability of the last relative to the last holder 212 and to reduce the risk that the last will move relatively to the last holder 202, when the last holder 212 is attached and/or fixed to the last 50.

The last comprises an attachment structure 213, where the attachment structure 213 in this example is in the example of a first opening 215 and a second opening 216, which extend in a vertical direction downwards into the inner volume 217 (shown in FIG. 15) of the last 50. The first opening 215 and the second opening 216 may e.g. be positioned in the bottom of the groove 210, where a fastening member 218 may extend from a bottom surface and/or the mating protrusion 211 of the last holder 212. The attachment structure may extend a predefined distance into the inner volume 217, allowing the fastening member to come into contact with an inner surface 219 of the attachment structure, where the fastening member 218 secures the last holder 212 to the connecting part 208 of the last 50.

The last may be manufactured by additive manufacturing, e.g. based on last descriptive data provided by the design facility (DF), where the side wall, the connecting part and the attachment structure are produced continuously in a continuous process, where the side wall, connecting part and the attachment structure are integrated with each other, and may provide a continuous structure. It is noted, though, that it will be understood that only one or more parts of the last may be made by additive manufacturing, e.g. by 3D printing, based on descriptive data provided by the design facility. This may for example be the case when the additive manufacturing is made on basis of parts that have been provided in advance as e.g. standard parts, or when the additive manufacturing is related to a subpart of the last.

FIG. 15a shows a vertical cross section taken along a longitudinal and vertical axis of an exemplified last 50. The last comprises a side wall 207 which has a front inner surface 220 and a back inner surface 221 as well as a lower inner surface 222, where the front inner surface 220, back inner surface 221 and lower inner surface 222 define the inner volume 217 of the last 50.

The side wall may have a thickness that is sufficient to provide resistance to e.g. a sole injection mould. In case the side wall may need to be strengthened in view of one wall relative to another wall, the last 50, may comprise one or more support structures 223, 224, where the support structures may e.g. be seen as providing support from one inner surface area to another inner surface area. In this example, the last 50 comprises a first support structure 223, which extend from the lower inner surface 222 of the last to the back inner surface 221 of the last 50, where a force that may e.g. be applied the heel end 202 of the last may be transferred via the support structure 223 towards the lower surface 206 (lower side wall) of the last. Similarly, the last may be provided by a second support structure 224, which extends from the front inner surface 220 to the lower inner surface 222 of the last, to transfer forces from one side wall to the other. The support structure 223 and 224 may be integral with the side wall 207 and may be manufactured as additive manufacturing along with the side wall 207 of the last 50.

FIG. 15a also shows an alternative attachment structure 213, where the last has a first opening 215 and a second opening 216 positioned at the connecting part 208 of the last 50, allowing a last holder to be attached to the last 50. The attachment structure may comprise a first bore 225 and a second bore 226, having a side wall which extends in vertical direction downwards from the openings 215 and 216. The bores 225 and 226 have a inner surface, which allows a fastening member to be fixed to the attachment structure, and thereby holding a connective device, such as a last holder to the last 50. The bore may be attached to the inner surface of the side walls using mounting structures 228-231, where the first 228 and third mounting structures 230 may be connected to the front inner surface 220 of the last 50, while the second 229 and the fourth mounting structure 231 may be attached to the back inner surface 221 of the last. Furthermore, the first bore 225 may be connected to the second bore 226 using a fifth mounting structure 232. The mounting structures may be used to fix the attachment structure relative to the side wall 208 of the last 50, allowing the last holder 212 (as shown in FIG. 14) to be attached to the last 50. The mounting structures 228, 229, 230 and 231 may be integral with the side walls 207 of the last 50, creating an unbroken material from one side wall to the other via the attachment structure 213.

It is furthermore noted that the last may be provided with a heel body, which has at least partly the shape of a human heel, and where the heel body may be attached to a rear part of the last body, such that the heel body may be moveable relative to the last body. This is illustrated in FIGS. 15b and 15c, which essentially shows a last 50 as has been explained in connection with FIG. 15a. In FIG. 15b it is shown that a heel body 240 is detachable from the remaining last body along a dividing line 242 or a dividing curve, dividing plane or the like. In FIG. 15c it is shown that the heel body 240 may be moved to separate it from the remaining last body as illustrated by the movement illustrated by the double-arrow 244 and that it can be moved back again to form the complete last 50. The heel body may be moved via (not shown) hinge means or the like and the movement may be linear, curved or any other type of movement that is suitable. Thus, when an upper is to be attached to the last, the heel body may be moved, thus making it easier to mount and remove uppers as well from the last. In one exemplary embodiment the heel body is configured to be moved relative to the last body, where the movement may be in a vertical direction. The heel body may for example be slideably mounted, having a first position as shown in FIG. 15b, where the last has the shape of a human foot, and a second position as shown in FIG. 15c, where the heel body is positioned in a vertical downwards position and/or a longitudinal forwards position relative to the first position of the heel body. The movable heel body 240 may comprise a larger or smaller part of the last than illustrated in FIGS. 15b and 15c.

FIG. 16 illustrates a further embodiment of a system for manufacturing equipment for DIP production of footwear, including manufacturing of tooling, and a method of manufacturing footwear according to the present disclosure. This system corresponds to FIG. 1 and includes a design facility (DF) 10, a mould manufacturing facility (MMF) 12, a last manufacturing facility (LMF) 16 and a plurality of footwear manufacturing facilities (FMF-1-n) 20.

At the mould manufacturing facility (MMF) 12 a mould 40 is made, based on the design communicated (e.g. 11) from the design facility 10, e.g. by CNC machines, casting etc., out of metal, e.g. aluminium. The mould 40, a section of which is schematically illustrated in FIG. 16 in a dash circle, is transported as illustrated at 14 to the selected footwear manufacturing facility (FMF-1) 20 located at a footwear manufacturing location, possibly via the design facility (DF) 10.

As regards the last 50, it is illustrated in FIG. 16 that the design data regarding the last, e.g. last descriptive data, are communicated (e.g. 15) from the design facility 10 to the last manufacturing facility (LMF) 16. Here, the last may be made by e.g. additive manufacturing, 3D printing or the like and the last is subsequently transported to the selected footwear manufacturing facility (FMF-1) 20.

If initial tests at the footwear manufacturing facility (FMF-1) 20 show that corrections need to be made to the last, such information may be communicated to the last manufacturing facility (LMF) 12 and/or the design facility 10 (e.g. as feedback 19), from where corrected last descriptive data may be returned to the last manufacturing facility (LMF) 12 for manufacture of a new last. Thus, return transport of the last from the footwear manufacturing facility (FMF-1) 20 to the last manufacturing facility (LMF) 12 may thus be avoided.

The same applies as regards the scenario where a new design, other shoe sizes etc. have to be manufactured, where new last descriptive data are being delivered to the last manufacturing facility (LMF) from the design facility for manufacturing of new lasts, which subsequently are being transported to the footwear manufacturing facility (FMF-1) 20.

FIG. 17 illustrates a still further embodiment of a system for manufacturing equipment for DIP production of footwear, including manufacturing of tooling, and a method of manufacturing footwear according to the present disclosure. This system corresponds to FIG. 16 and includes a design facility (DF) 10, a mould manufacturing facility (MMF) 12 and a plurality of footwear manufacturing facilities (FMF-1-n) 20. Further, a last manufacturing facility (LMF) 16 is shown, however only as an optional feature, since it may not be necessary according to this embodiment.

Analogously to what was explained above in connection with FIG. 16, it is indicated in FIG. 17 that a mould 40 is made at the mould manufacturing facility (MMF) 12, based on the design communicated (e.g. 11) from the design facility 10, e.g. by CNC machines, casting etc., out of metal, e.g. aluminium. The mould 40, a section of which is schematically illustrated in FIG. 17 in a dash circle, is transported as illustrated at 14 to the selected footwear manufacturing facility (FMF-1) 20 located at a footwear manufacturing location, possibly via the design facility (DF) 10.

As regards the last 50, it is illustrated in FIG. 17 that the design data regarding the last, e.g. last descriptive data, are communicated (e.g. 15) from the design facility 10 to the selected footwear manufacturing facility (FMF-1) 20. Here, at the selected footwear manufacturing facility (FMF-1) 20 or at another location nearby (not shown), e.g. locally, the last may be made by e.g. additive manufacturing, 3D printing or the like and the last 50 will thus be readily available for testing, manufacture of footwear, etc. at the selected footwear manufacturing facility (FMF-1) 20.

If initial tests at the footwear manufacturing facility (FMF-1) 20 show that corrections need to be made to the last, such information may be communicated (e.g. as feedback 19) to the design facility 10, from where corrected last descriptive data may be returned to the footwear manufacturing facility (FMF-1) 20 for e.g. local manufacture of a new last. Thus, transport of the last from the last manufacturing facility (LMF) 12 to the footwear manufacturing facility (FMF-1) 20 and any return of the last for e.g. correction may thus be avoided.

The same applies as regards the scenario where a new design, other shoe sizes etc. have to be manufactured, where new last descriptive data are being delivered to the footwear manufacturing facility (FMF-1) 20 from the design facility for manufacturing of new lasts, which thus will be readily available for testing, manufacture of footwear, etc. at the selected footwear manufacturing facility (FMF-1) 20.

Public data network or a public data communication network is a network established and operated by a telecommunications administration, or a recognized private operating agency, for the specific purpose of providing data transmission services for the public.

In communications, a public data network is a circuit- or packet-switched network that is available to the public and that can transmit data in digital form. A public data network provider is a company that provides access to a public data network and that provides any of X.25, frame relay, or cell relay services. In the present context a packet switched network.

Public data network in the present context may typically materialize by means of the Internet.

The Internet (portmanteau of interconnected network) is the global system of interconnected computer networks that use the Internet protocol suite (TCP/IP) to link devices worldwide. It is a network of networks that consists of private, public, academic, business, and government networks of local to global scope, linked by a broad array of electronic, wireless, and optical networking technologies. The Internet carries a vast range of information resources and services, such as the inter-linked hypertext documents and applications of the World Wide Web (WWW), electronic mail, telephony, and file sharing.

Some principles of different embodiments of the invention will be described below with reference to FIG. 18a-c.

FIG. 18a discloses a system as explained below.

At the premises of the design facility (DF) a computer (DCOMP) is coupled to a public data network (PDN) by means of a design facility router (DFR).

A router may be a networking device that forwards data packets between computer networks. Routers perform the traffic directing functions on the Internet. Data sent through the internet, such as a web page or email, is in the form of data packets. A packet is typically forwarded from one router to another router through the networks that constitute an internetwork (e.g. the Internet) until it reaches its destination node. A router may be connected to two or more data lines from different networks. When a data packet comes in on one of the lines, the router reads the network address information in the packet to determine the ultimate destination. Then, using information in its routing table or routing policy, it directs the packet to the next network on its journey.

The most familiar type of routers are home and small office routers that simply forward IP packets between the home computers and the Internet. An example of a router would be the owner's cable or DSL router, which connects to the Internet through an Internet service provider (ISP). More sophisticated routers, such as enterprise routers, connect large business or ISP networks up to the powerful core routers that forward data at high speed along the optical fiber lines of the Internet backbone. Though routers are typically dedicated hardware devices, software-based routers also exist.

In the present context the design facility router (DFR) may connect communicatively with a manufacturing facility router (MFR) at a mould manufacturing facility (MMF).

At the design facility end one or more computers (DCOMP) are running a 3D modeling software for establishment of last/last part(s) and/or mould/mould part(s) by means of which a designer or an operator may establish descriptive data of the last/last part(s) and/or mould/mould part(s) and by means of which mutually cooperating last/last part(s) and/or mould/mould part(s) designs may be established. A last/last part(s) must fit with corresponding mould/mould part(s) when manufacturing the final footwear in a direct injection production equipment (DIPE) at the footwear manufacturing facility.

The last/last part(s) and/or mould/mould part(s) as established design is then converted and represented by a data format, typically by means of the 3D modeling software and transmitted via the design facility router (DFR), the public data network and the manufacturing facility router (MFR) to the manufacturing facility for 3D printing by means of a 3D printer (M-3DP)located manufacturing facility and then subsequently applied for the mass production of footwear by means of the last/last part(s) and/or mould/mould part(s) together with the direct injection production equipment (DIPE).

The network may optionally comprise a design facility 3D printer (D-3DP) by means of which a designer or operator to the computers may make real life physical last/last part(s) and/or mould/mould part(s) either during testing and design of these parts or during a phase where design flaws, faults, mismatch's between the mould, last and direct injection production equipment (DIPE) leading to a unintentional manufacturing and optionally unintended final footwear products. It is even possible "mirroring" the production setup of the footwear manufacturing facility at the design facility, or at least close to mirroring it, so the design facility may perform checks which, in practice, could only be made at the footwear manufacturing facility.

FIG. 18b discloses a system as explained below.

At the premises of the design facility (DF) a computer (DCOMP) is coupled to a public data network (PDN) by means of a design facility router (DFR).

A router may be a networking device that forwards data packets between computer networks. Routers perform the traffic directing functions on the Internet. Data sent through the internet, such as a web page or email, is in the form of data packets. A packet is typically forwarded from one router to another router through the networks that constitute an internetwork (e.g. the Internet) until it reaches its destination node. A router may be connected to two or more data lines from different networks. When a data packet comes in on one of the lines, the router reads the network address information in the packet to determine the ultimate destination. Then, using information in its routing table or routing policy, it directs the packet to the next network on its journey.

The most familiar type of routers are home and small office routers that simply forward IP packets between the home computers and the Internet. An example of a router would be the owner's cable or DSL router, which connects to the Internet through an Internet service provider (ISP). More sophisticated routers, such as enterprise routers, connect large business or ISP networks up to the powerful core routers that forward data at high speed along the optical fiber lines of the Internet backbone. Though routers are typically dedicated hardware devices, software-based routers also exist.

In the present context the design facility router (DFR) may connect communicatively with a manufacturing facility router (MFR) at last manufacturing facility (LMF).

At the design facility end one or more computers (DCOMP) are running a 3D modeling software for establishment of last/last part(s) and/or mould/mould part(s) by means of which a designer or an operator may establish descriptive data of the last/last part(s) and/or mould/mould part(s) and by means of which mutually cooperating last/last part(s) and/or mould/mould part(s) designs may be established. A last/last part(s) must fit with corresponding mould/mould part(s) when manufacturing the final footwear in a direct injection production equipment (DIPE) at the footwear manufacturing facility.

The last/last part(s) and/or mould/mould part(s) as established design is then converted and represented by a data format, typically by means of the 3D modeling software and transmitted via the design facility router (DFR), the public data network and the manufacturing facility router (MFR) to the manufacturing facility for 3D printing by means of a 3D printer (M-3DP)located manufacturing facility and then subsequently applied for the mass production of footwear by means of the last/last part(s) and/or mould/mould part(s) together with the direct injection production equipment (DIPE).

The network may optionally comprise a design facility 3D printer (D-3DP) by means of which a designer or operator to the computers may make real life physical last/last part(s) and/or mould/mould part(s) either during testing and design of these parts or during a phase where design flaws, faults, mismatch's between the mould, last and direct injection production equipment (DIPE) leading to a unintentional manufacturing and optionally unintended final footwear products. It is even possible "mirroring" the production setup of the footwear manufacturing facility at the design facility, or at least close to mirroring it, so the design facility may perform checks which, in practice, could only be made at the footwear manufacturing facility.

FIG. 18c discloses a system as explained below.

At the premises of the design facility (DF) a computer (DCOMP) is coupled to a public data network (PDN) by means of a design facility router (DFR).

A router may be a networking device that forwards data packets between computer networks. Routers perform the traffic directing functions on the Internet. Data sent through the internet, such as a web page or email, is in the form of data packets. A packet is typically forwarded from one router to another router through the networks that constitute an internetwork (e.g. the Internet) until it reaches its destination node. A router may be connected to two or more data lines from different networks. When a data packet comes in on one of the lines, the router reads the network address information in the packet to determine the ultimate destination. Then, using information in its routing table or routing policy, it directs the packet to the next network on its journey.

The most familiar type of routers are home and small office routers that simply forward IP packets between the home computers and the Internet. An example of a router would be the owner's cable or DSL router, which connects to the Internet through an Internet service provider (ISP). More sophisticated routers, such as enterprise routers, connect large business or ISP networks up to the powerful core routers that forward data at high speed along the optical fiber lines of the Internet backbone. Though routers are typically dedicated hardware devices, software-based routers also exist.

In the present context the design facility router (DFR) may connect communicatively with a manufacturing facility router (MFR) at a mould manufacturing and/or last manufacturing facility (MMF, LMF). One or both of these facilities may be located and configured for communication at the footwear manufacturing facility. These facilities may within the scope of the invention be located at three different locations. It is however preferred that the last and mould manufacturing facilities are close to or effectively are part of the footwear manufacturing facility as such a configuration offers a very fast setup time, cost efficient running and minimal negative climate load.

At the design facility end one or more computers (DCOMP) are running a 3D modeling software for establishment of last/last part(s) and/or mould/mould part(s) by means of which a designer or an operator may establish descriptive data of the last/last part(s) and/or mould/mould part(s) and by means of which mutually cooperating last/last part(s) and/or mould/mould part(s) designs may be established. A last/last part(s) must fit with corresponding mould/mould part(s) when manufacturing the final footwear in a direct injection production equipment (DIPE) at the footwear manufacturing facility.

The last/last part(s) and/or mould/mould part(s) as established design is then converted and represented by a data format, typically by means of the 3D modeling software and transmitted via the design facility router (DFR), the public data network and the manufacturing facility router (MFR) to the manufacturing facility for 3D printing by means of a 3D printer (M-3DP)located manufacturing facility and then subsequently applied for the mass production of footwear by means of the last/last part(s) and/or mould/mould part(s) together with the direct injection production equipment (DIPE).

The network may optionally comprise a design facility 3D printer (D-3DP) by means of which a designer or operator to the computers may make real life physical last/last part(s) and/or mould/mould part(s) either during testing and design of these parts or during a phase where design flaws, faults, mismatch's between the mould, last and direct injection production equipment (DIPE) leading to a unintentional manufacturing and optionally unintended final footwear products. It is even possible "mirroring" the production setup of the footwear manufacturing facility at the design facility, or at least close to mirroring it, so the design facility may perform checks which, in practice, could only be made at the footwear manufacturing facility.

It should furthermore be noted that the systems and methods as disclosed with reference to FIGS. 9, 16, 17 and 18*a-c* may be combined in any possible variations, e.g. for example by having descriptive mould insert data (FIG. 9) as well as last descriptive data (FIG. 17) being communicated from the design facility (DF) 10 to the footwear manufacturing facility (FMF-1) 20 and where mould inserts as well as lasts are being made at the footwear manufacturing facility (FMF-1) 20 or at least locally in order to facilitate e.g. cost-efficiency and rapid start-up of manufacture of footwear.

FIGS. 19*a*-19*c* illustrate a further embodiment of the direct injection mould inserts and in particular the first side insert 172 and the second side insert 174. Thus, FIG. 19*a* shows an embodiment of a cross-sectional view of a pair of a first side insert 172 and a second side insert 174, corresponding to the examples as illustrated in e.g. FIGS. 4-8. However, the insert lip 180 of the side inserts as illustrated in FIGS. 19*a*-19*c* is configured in a particular manner as it will be explained in the following.

FIG. 19*b* corresponds to FIG. 8 and thus shows an embodiment of a cross-sectional view of a footwear injection moulding system 40, where a footwear part is moulded and where the side inserts as illustrated in FIG. 19*a* are applied. Thus, it is shown that injected material has expanded to fill the mould cavity to form a footwear sole 100 as it has been explained in connection with e.g. FIGS. 4-8.

FIG. 19*b* shows that the injected material has expanded to fill out the entire volume of the injection chamber and thus has come into contact with the inner surfaces 143, 145, 147 of the first side insert 172, the second side insert 174 and the bottom insert 176, respectively, and the outer surface 62 of the footwear upper 60, thereby causing the injected material to take the corresponding shape to form a footwear sole 100.

When the injected material has cured, the first 142 and second basic side mould 144 together with the first side insert 172 and the second side insert 174, respectively, may be moved in an e.g. horizontal movement, and the basic bottom mould 146 together with the bottom insert 176 may be moved e.g. downwards, thereby opening the footwear injection mould, whereby the last 50, the upper 60 and the sole 100 may be removed from the mould 40.

In FIG. 19*b*, the lip 180 is pushed into contact with the outer surface 62 of the footwear upper part 60. Thereby, the lip 180 closes off (seals off) the injection chamber together with the bottom part of the footwear upper part 60, and assists in preventing injected material, which is introduced into the injection chamber, from escaping the injection chamber via the upper part of the injection chamber. The lip 180 may have a shape that is adapted to follow the outer surface 62 of the footwear upper 60.

The features of the first side insert 172 and the second side insert 174 and in particular the lip 180 will be explained in further detail in the following with reference to FIG. 19*c*, which is an enlarged view of the cut-out 300 shown in FIG. 19*b*, where the circular cut-out 300 is relating to the lip area of the first side insert 172. It will be understood, though, that what is explained in the following similarly applies to the second side insert 174, its lip 180, etc. as well.

In FIG. 19c, the cut-out 300 shows the lip 180 contacting the outer surface 62 of the footwear upper 60, wherein the lip 180 may have a shape that is adapted to follow the outer surface 62 of the footwear upper 60. The lip 180 may be in the form of a ridge.

The shape of the lip 180 and of said outer surface 62 are shown to be flat and to extend in a plane, e.g. a vertical plane. Obviously, the lip 180 and the outer surface 62 may have various other shapes, such as rough, bend, curvilinear.

The lip 180 may comprise an upper contacting surface 302 for contacting the outer surface 62 of a footwear upper 60, a connecting end 304 connected to the first side insert 172, an upper surface 306 faced away from the injection chamber and a lower surface 308 faced towards the injection chamber as shown in FIG. 19c.

The lip 180 may have a height h2 at the connecting end 304 of the lip 180 that is larger than the height h1 at the upper contacting surface 302 of the lip 70, relative to a normal A of the upper contacting surface 302. The normal A of the upper contacting surface 302 is configured to intersect a centre point of the upper contacting surface 302 seen in the height direction as illustrated in FIG. 19c. A lip plane is defined by the normal A of the upper contacting surface 302 along a width of the lip 180, said lip plane configured to define a boundary between an upper half 310 and a lower half 312 of the lip 180, the upper half 310 arranged between the lip plane and the upper surface 306 and the lower half 312 arranged between the lip plane and the lower surface 308.

The lip 180 has a length l1 (as shown in FIG. 19c) defined by the distance from the upper contacting surface 302 to the connecting end 304 along the normal A of the upper contacting surface 302.

In one example, the height h1 may be in the region between 2 to 6 mm, where the height h1 may more specifically be between 3 and 5 mm, or even more specifically around 4 mm. The height h1 of the upper contacting surface 302 has been shown as being above 2 mm, as a lower thickness may cause the material to bend, deform or warp during injection. This may especially be in a situation where the mould insert is 3D printed from e.g. a polymeric material.

In comparison, traditional moulds, made out of aluminum or other metal substances may have an upper contacting surface height h1 that is around 1.5 mm.

In one example, the height h2 may be between 6 and 15 mm, where the height h2 may more specifically be between 7 and 12 mm, where the height may more specifically be between 5-8 and 10 mm. The increased height h2 provides support to the lip especially when the material is 3D printed from e.g. a polymeric material. In comparison, traditional moulds made out of aluminium or other metal substances may have a height h2 that is close to 2-3 mm.

In one embodiment the size ratio between the height h1 and h2 may be around 1:2, where h2 may be twice the height of h1. In one embodiment the size ratio may be around 1:1.5, where the height h2 is 50% larger than h1.

In one exemplary embodiment the length of the lip l1 may have a size that is at least larger than the height h2, i.e. that the length ratio between the length of the lip vs. the height h2 is at least 1:1. In another embodiment the length of the lip may have a size that is smaller than the height h2, i.e. l1<h2. Thus, the height h2 provides support for the length of the lip, where the height h2 of the lip may have to be increased when the length l1 is increased.

It should be noted that last, last parts, mould, and/or mould parts in FIGS. 3-8, FIG. 10-15 and FIG. 19a-19c may be established on the basis of respective descriptive data.

LIST OF REFERENCE NUMBERS

10 Design facility
11 Forwarding of footwear design data regarding mould
12 Mould manufacturing facility
14 Mould transport
15 Forwarding of footwear design data regarding last
16 Last manufacturing facility
18 Last transport
19 Feedback
20 Footwear manufacturing facility
40 Mould
42 First side mould
43 First side surface
44 Second side mould
45 Second side surface
46 Bottom mould
47 Bottom inner surface
50 Last
60 Footwear upper
62 Outer surface of footwear upper
64 Bottom part of footwear upper
80 Mould cavity
90 Injected material
100 Footwear sole
140 Basic direct injection mould
142 First basic side mould
143 First side insert surface
144 Second basic side mould
145 Second side insert surface
146 Basic bottom mould
147 Bottom insert surface
152 Basic side coupling element
152' Protruding part
152" Depression
154 Insert side coupling element
154' Protruding part
154" Depression
156 Basic bottom coupling element
158 Bottom insert coupling element
172 First side insert
173 First contact surface
174 Second side insert
175 Second contact surface
176 Bottom insert
178 First upper contact surface
179 Second upper contact surface
180 Insert lip
201 Toe end
202 Heel end
203 Medial end
204 Lateral end
205 Upper surface
206 Lower surface
207 Side wall
208 Connecting part
209 Connecting surface
210 Groove
211 Mating protrusion
212 Last holder
213 Attachment structure
214 Outer surface
215 First opening 216 Second opening
217 Inner volume
218 Fastening member
219 Inner surface
220 Front inner surface
221 Back inner surface
222 Lower inner surface
223 First support structure
224 Second support structure
225 First bore
226 Second bore
228 First mounting structure
229 Second mounting structure
230 Third mounting structure
231 Fourth mounting structure
232 Fifth mounting structure
240 Heel body
242 Dividing line
244 Movement of heel body
300 Cut-out
302 Upper contacting surface
304 Connecting end
306 Upper surface
308 Lower surface
310 Upper half
312 Lower half
DF Design facility
MMF Mould manufacturing facility
LMF Last manufacturing facility
FMF Footwear manufacturing facility
PDN Public data network
DFR Design facility router
MFR Manufacturing facility router
DCOMP Computer
D-3DP 3D printer
DIPE Direct injection production equipment
A Normal to the upper contacting surface 302 (at centre point)
h1 Height of lip at the upper contacting surface
h2 Height of lip at the connecting end
l1 Length of lip

The invention claimed is:

1. A method of manufacturing footwear by direct injection production at at least one footwear manufacturing facility located at a footwear manufacturing location, wherein said method includes providing at least one mold that is configured for direct injection production of footwear, said method comprising:

providing a footwear design and mold descriptive data relating to direct injection mold inserts by a design facility located at a design facility location;

manufacturing a mold corresponding to said footwear design by a mold manufacturing facility located at a mold manufacturing location, said mold being configured for direct injection mold of a sole part of said footwear, wherein said mold comprises a basic direct injection mold, which is attachable to injection mold equipment and is configured for at least partly channelling injection material to a mold cavity, said basic direct injection mold further being configured for accommodating direct injection mold inserts to further define said mold cavity;

manufacturing a last corresponding to said footwear design by a last manufacturing facility located at a last manufacturing location;

communicating said mold descriptive data to the at least one footwear manufacturing facility for additive manufacturing of said direct injection mold inserts at said footwear manufacturing location;

testing said direct injection mold inserts at said at least one footwear manufacturing facility and communicating correction information to the design facility;

providing by the design facility corrected mold descriptive data to said at least one footwear manufacturing facility;

combining said direct injection mold inserts with said basic direct injection mold to provide said mold corresponding to said footwear design at said footwear manufacturing location, and manufacturing at least one piece of footwear according to said footwear design by the at least one footwear manufacturing facility located at the footwear manufacturing location, whereby said last corresponding to said footwear design and said mold corresponding to said footwear design are utilized.

2. The method according to claim 1, wherein said mold descriptive data relating to said direct injection mold inserts are provided by said mold manufacturing facility.

3. The method according to claim 1, wherein said basic direct injection mold and said direct injection mold inserts further comprise mutually engaging coupling means that are footwear design specific, customer specific, and/or footwear manufacturing facility specific.

4. The method according to claim 1, further comprising providing mutually engaging coupling means that include at each contact surface of the mold inserts and each mating contact surface of the basic direct injection mold, at least one depression in and at least one protruding part of the contact surface, arranged such that the mutually engaging coupling means at the contact surfaces are matching each other.

5. The method according to claim 1, wherein an additive manufacturing material utilized by said additive manufacturing comprises one or more polymers.

6. The method according to claim 5, wherein an additive manufacturing material utilized by said additive manufacturing comprises one or more photopolymers.

7. The method according to claim 1, wherein additive manufacturing materials utilized by said additive manufacturing comprises at least one material selected from the group consisting of: ABS, PLA, ASA, nylon, PETG, metal, plaster powder, HIPS, PET, PEEK, PVA, ULTEM, and ceramics.

8. The method according to claim 5, wherein said additive manufacturing material utilized by said additive manufacturing comprises a material, that when cured, provides a surface that is adhesion defiant to the injected material.

9. The method according to claim 1, further comprising providing mold descriptive data corresponding to said footwear design, provided to the mold manufacturing facility, and/or the footwear manufacturing facility via a public data network.

10. The method according to claim 8, wherein said adhesion defiance is obtained by use of polyurethane as injection material and additive manufacturing material.

11. The method according to claim 8, wherein said adhesion defiance is obtained by use of polyurethane as injection material and one or more photopolymers as additive manufacturing material.

12. The method according to claim 8, wherein said adhesion defiance is obtained by use of polyurethane as injection material and additive manufacturing material including one or more of: ABS, PLA, ASA, nylon, PETG, metal, plaster powder, HIPS, PET, PEEK, PVA, ULTEM, or ceramics.

13. The method according to claim 1, including operating as a distributed machine comprising distributed operations at the design facility location, the mold manufacturing location, the last manufacturing location, and the footwear manufacturing location.

14. The method according to claim 1, wherein a thermal conductive medium is applied between the direct injection mold inserts and corresponding contact surfaces of the basic direct injection mold.

15. The method according to claim 1, wherein the direct injection mold inserts include side insert(s) having an insert lip, and wherein the insert lip comprises an upper contacting surface for contacting the outer surface of a footwear upper and a connecting end connected to a respective side insert.

16. The method according to claim 15, wherein the upper contacting surface has a height h1 in a range of 2-6 mm, and/or wherein the connecting end has a height h2 in a range of 6-15 mm.

\* \* \* \* \*